US009237357B2

(12) United States Patent
Park et al.

(10) Patent No.: US 9,237,357 B2

(45) Date of Patent: Jan. 12, 2016

(54) METHOD AND AN APPARATUS FOR PROCESSING A VIDEO SIGNAL

(75) Inventors: Joon Young Park, Seoul (KR); Byeong Moon Jeon, Seoul (KR); Seung Wook Park, Seoul (KR); Yong Joon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 952 days.

(21) Appl. No.: 12/675,980

(22) PCT Filed: Sep. 2, 2008

(86) PCT No.: PCT/KR2008/005150

§ 371 (c)(1), (2), (4) Date: May 7, 2010

(87) PCT Pub. No.: WO2009/028922

PCT Pub. Date: Mar. 5, 2009

(65) Prior Publication Data

US 2010/0239002 A1 Sep. 23, 2010

Related U.S. Application Data

(60) Provisional application No. 61/042,244, filed on Apr. 3, 2008, provisional application No. 61/035,042, filed on Mar. 10, 2008, provisional application No. 60/974,069, filed on Sep. 20, 2007, provisional application No. 60/969,641, filed on Sep. 2, 2007.

(51) Int. Cl.

*H04N 7/32* (2006.01)
*H04N 19/59* (2014.01)

(Continued)

(52) U.S. Cl.

CPC ............... *H04N 19/59* (2014.11); *H04N 19/11* (2014.11); *H04N 19/115* (2014.11); *H04N 19/14* (2014.11);

(Continued)

(58) Field of Classification Search

CPC .................. H04N 19/00157; H04N 19/00533; H04N 19/00757; H04N 19/00288

USPC .......................................................... 375/240

See application file for complete search history.

(56) References Cited

U.S. PATENT DOCUMENTS

| | | | |
|---|---|---|---|
| 6,081,622 | A | 6/2000 | Carr et al. |
| 6,282,243 | B1 | 8/2001 | Kazui et al. |

(Continued)

FOREIGN PATENT DOCUMENTS

| | | | |
|---|---|---|---|
| EP | 1 761 064 | A2 | 3/2007 |
| JP | 11-046361 | A | 2/1999 |

(Continued)

OTHER PUBLICATIONS

Titled "Improved fast intra prediction algorithm of H.264/AVC" Authors: Liu Qiong, Hu Rui-min, Zhu Li, Zhang Xin-chen, Han Zhen 2006.*

(Continued)

*Primary Examiner* — Tat Chio
*Assistant Examiner* — Nguyen Truong
(74) *Attorney, Agent, or Firm* — Fish & Richardson P.C.

(57) ABSTRACT

A method of processing a video signal is disclosed. The present invention includes receiving prediction mode information of a current block, generating a half pel using an integer pel of a neighbor block, and generating a predictor of the current block using the half pel and the prediction mode information.

19 Claims, 36 Drawing Sheets

(51) Int. Cl.

| | |
|---|---|
| ***H04N 19/176*** | (2014.01) |
| ***H04N 19/147*** | (2014.01) |
| ***H04N 19/46*** | (2014.01) |
| ***H04N 19/115*** | (2014.01) |
| ***H04N 19/593*** | (2014.01) |
| ***H04N 19/11*** | (2014.01) |
| ***H04N 19/14*** | (2014.01) |
| ***H04N 19/44*** | (2014.01) |

(52) U.S. Cl.

CPC ........... *H04N 19/147* (2014.11); *H04N 19/176* (2014.11); *H04N 19/44* (2014.11); *H04N 19/46* (2014.11); *H04N 19/593* (2014.11)

(56) References Cited

U.S. PATENT DOCUMENTS

| | | | | |
|---|---|---|---|---|
| 6,525,783 | B1 | 2/2003 | Kim et al. | |
| 2004/0028129 | A1 * | 2/2004 | Nagumo et al. | 375/240.08 |
| 2005/0111553 | A1 * | 5/2005 | Seok et al. | 375/240.17 |
| 2007/0053443 | A1 | 3/2007 | Song | |
| 2009/0046781 | A1 | 2/2009 | Moriya et al. | |

FOREIGN PATENT DOCUMENTS

| | | | | |
|---|---|---|---|---|
| JP | 11-146367 | A | 5/1999 | |
| JP | 03191753 | B2 | 7/2001 | |
| JP | 2007-074725 | A | 3/2007 | |
| JP | 2007-135036 | A | 5/2007 | |
| KR | 10-2005-0036302 | A | 4/2005 | |
| KR | 10-2007-0027237 | A | 3/2007 | |
| WO | WO 2007/004117 | A1 | 1/2007 | |
| WO | WO 2007/034918 | A1 | 3/2007 | |
| WO | WO 2007/093629 | A1 | 8/2007 | |
| WO | WO 2008/085109 | A1 | 7/2008 | |
| WO | WO2008085109 | * | 7/2008 | H04N 7/50 |

OTHER PUBLICATIONS

Kisub Lee, et al.; An implementation of H. 264 intra predictor based on sub-sampling, APCCAS 2006, p. 1079-1082, (Dec. 2006).

Liu Qiong, et al.; "Improved fast intra prediction algorithm of H.264/AVC", Journal of Zhejiang University Science, 2006, p. 101-105, (Jul. 2006).

Yongjun Wu, et al.; "Directional spatial I-block for the mc-ezbc video coder", ICASSP 2004, p. 129-132. (May 2004).

European Office Action dated Jul. 18, 2012 for Application No. 08828216, 7 pages.

Yuri Vatis et al.; "Two-dimensional non-separable Adaptive Wiener Interpolation Filter for H.264/AVC", 72. MPEG Meeting; Apr. 18, 2005-Apr. 22, 2005;Busan; (Motion Picture Expert Group or ISO/IEC JTC1/SC29/WG11), No. M11845, Apr. 29, 2005, XP030040567, ISSN: 0000-0249 p. 1.

Zhuo Zhao, et al.; "A Highly Efficient Parallel Algorithm for H.264 Video Encoder", Acoustics, Speech and Signal Processing, 2006. ICASSP 2006 Proceedings. 2006 IEEE International Conference on Toulouse, France May 14-19, 2006, Piscataway, NJ, USA, IEEE, Piscataway, NJ, USA, May 14, 2006, p. B, XP031387155, DOI: 10.1109/ICASSP.2006.1661319 ISBN:978-1-4244-0469-8 abstract, p. 490, left-hand column.

International Search Report dated Feb. 27, 2009 for Application No. PCT/KR2008/005150, 2 pages.

Korean Notice of Allowance dated Aug. 28, 2015 for Korean Application No. 10-2010-7006230, with English Translation, 4 pages.

* cited by examiner

Mode0: Vertical m=i=e=a <=A
n=j=f=b <=C
o=k=g=c <=E
p=l=h=d <=G

Mode1: Horizontal d=c=b=a= <=P
h=g=f=e= <=R
l=k=j=i <=T
p=o=n=m <=V

Mode2: DC a~p <=average of (A~G, P~V)

Mode3: Diagonal down left a <= (A+2B+C)/4
e=b <= (C+2D+E)/4
i=f=c <= (E+2F+G)/4
m=j=g=d <= (G+2H+I)/4
n=k=h <= (I+2J+K)/4
o=l <= (K+2L+M)/4
p <= (M+2N+O)/4

Mode5: Diagonal down right d <= (E+2F+G)/4
h=c <= (C+2D+E)/4
l=g=b <= (A+2B+C)/4
p=k=f=a <= (P+2W+A)/4
o=j=e <= (R+2Q+P)/4
n=i <= (T+2S+R)/4
m <= (V+2U+T)/4

Mode5: Vertical right d <= (F+G)/2
h <= (E+F)/2
l=c <= (D+E)/2
p=g <= (C+D)/2
k=b <= (B+C)/2
o=f <= (A+B)/2
j=a <= (W+A)/4
n=e <= (Q+2P+W)/4
i <= (S+2R+Q)/4
m <= (U+2T+S)/4

Mode6: Horizontal down
d <= (D+2E+F)/4
c <= (B+2C+D)/4
h=b <= (W+2A+B)/4
g=a <= (P+W)/2
l=f <= (Q+P)/2
k=e <= (R+Q)/2
p=j <= (S+R)/2
o=l <= (T+S)/2
n <= (U+T)/2
m <= (V+U)/2

Mode7: Vertical left a <= (A+B)/2
e <= (B+C)/2
i=b <= (C+D)/2
m=f <= (D+E)/2
j=c <= (E+F)/2
n=g <= (F+G)/2
k=d <= (G+H)/2
o=h <= (H+I)/2
l <= (I+J)/2
p <= (J+K)/2

Mode8: Horizontal up a <= (P+Q)/2
b <= (Q+R)/2
c=e <= (R+S)/2
d=f <= (S+T)/2
g=i <= (T+U)/2
h=j <= (U+V)/2
m=k=n=l=o=p <= V (A)

(B)

(A)

(B)

METHOD AND AN APPARATUS FOR PROCESSING A VIDEO SIGNAL

TECHNICAL FIELD

The present invention relates to video signal processing, and more particularly, to an apparatus for processing a video signal and method thereof. Although the present invention is suitable for a wide scope of applications, it is particularly suitable for encoding or decoding a video signal.

BACKGROUND ART

Generally, compression coding means a series of signal processing techniques for transferring digitalized information via communication lines or storing digitalized information in a format suitable for a storage medium. Targets of compression coding include audios, images, characters, etc. In particular, a technique of performing compression coding on images is called video compression. Video is generally characterized in having spatial redundancy and temporal redundancy.

DISCLOSURE OF THE INVENTION

Technical Problem

However, if the spatial redundancy and the temporal redundancy are not sufficiently eliminated, a compression rate of coding a video signal is lowered. If the spatial redundancy and the temporal redundancy are excessively eliminated, it is unable to generate information required for decoding a video signal to degrade a reconstruction rate.

Technical Solution

Accordingly, the present invention is directed to an apparatus for processing a video signal and method thereof that substantially obviate one or more of the problems due to limitations and disadvantages of the related art.

An object of the present invention is to provide an apparatus for processing a video signal and method thereof, by which a current block can be predicted using a half pel instead of an integer pel of a neighbor area in performing intra-prediction on the current block.

Another object of the present invention is to provide an apparatus for processing a video signal and method thereof, by which various schemes can be performed to reduce complexity or bit rate in generating a half pel required for performing intra-prediction on a current block.

Another object of the present invention is to provide an apparatus for processing a video signal and method thereof, by which a current block corresponding to horizontally and/or vertically downsampled size can be intra-predicted.

A further object of the present invention is to provide an apparatus for processing a video signal and method thereof, by which a current block can be more accurately predicted in a manner of defining a block type including heterogeneous type blocks (e.g., 8×8 block and 4×4 bock) simultaneously.

Advantageous Effects

Accordingly, the present invention provides the following effects or advantages.

First of all, in performing intra-prediction on a current block, using a half pel generated from an integer pel of a neighbor area, a current block can be more accurately predicted. Therefore, it is able to save bits required for residual coding.

Secondly, in generating a half pel required for performing intra-prediction on a current block, it is able to use a prediction mode of a neighbor block or information required for prediction of the half pel (e.g., half pel prediction mode information, padding mode information, etc.). Therefore, it is able to considerably reduce complexity generated in a process of generating the half pel.

Thirdly, using a residual corresponding to a block having a smaller size in a manner of performing downsampling in a horizontal or vertical direction of a current block and a prediction block (predictor), in case that the current block has a monotonous shape in the horizontal and/or vertical direction, it is able to considerably reduce a size of residual information while it minimizes loss of a reconstruction rate. And, it is also able to reduce complexity in a coding process.

Fourthly, since a current block is more accurately predicted by defining a block type including both blocks (8×8 block and 4×4 bock) differing from each other in size simultaneously, it is able to reduce the number of bits required for residual coding as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
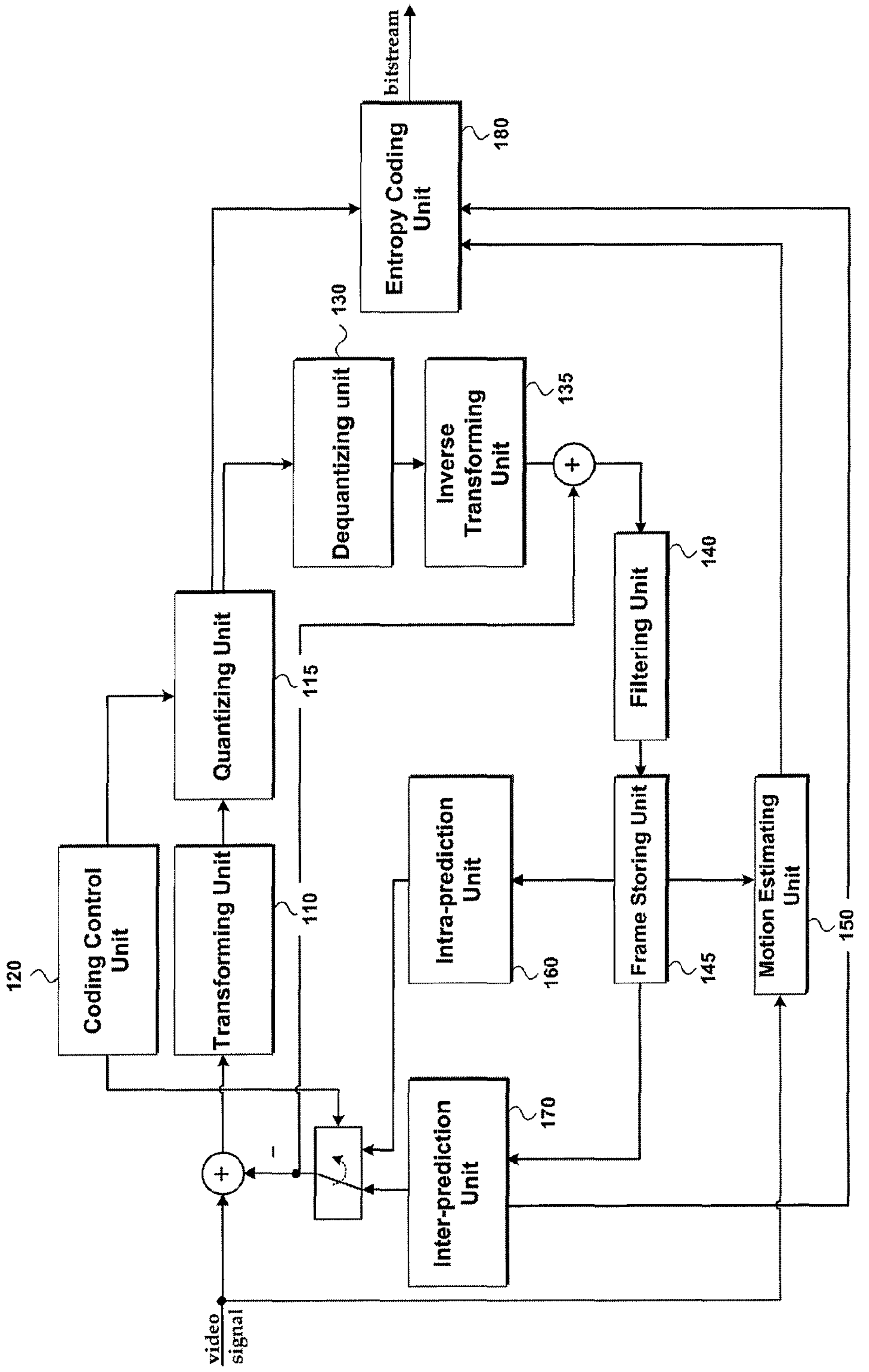
FIG. 1 is a schematic block diagram of a video signal encoding apparatus according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal according to the present invention includes receiving prediction mode information of a current block, generating a half pel using an integer pel of a neighbor block, and generating a predictor of the current block using the half pel and the prediction mode information.

According to the present invention, the half pel is located between a pel of the current block and the integer pel of the neighbor block.

According to the present invention, if a position of an upper left pel of the current block is (0, 0), a position of the half pel is (m/c, n/c) (where, at least one of the m and the n is −1 and the c is a constant).

According to the present invention, the prediction mode information corresponds to direction information for predicting a pel of the current block using the half pel.

According to the present invention, the prediction mode information corresponds to at least one of a vertical direction mode, a horizontal direction mode and a DC direction mode.

According to the present invention, the method further includes receiving a residual of the current block and generating a reconstructed block of the current block using the residual and the predictor.

According to the present invention, the half pel generating step includes generating a first half pel using the integer pel and a vertical filter and generating a second half pel using the integer pel and a horizontal filter, wherein if a position of an upper left pel of the current block is (0, 0), a position of the first half pel is (m/2, −½) (where the m is an even number) and a position of the second half pel is (−½, n/2) (where the n is an even number).

According to the present invention, the half pel generating step includes generating a third half pel using the first half pel and the horizontal filter and generating a fourth half pel using the second half pel and the vertical filter, wherein a position of the third half pel is (m/2, −½) (where the m is an odd number) and wherein a position of the fourth half pel is (−½, n/2) (where the n is an odd number).

According to the present invention, either the horizontal filter or the vertical filter includes a 6-tab filter.

According to the present invention, the half pel generating step includes obtaining prediction mode information of the neighbor block and generating the half pel using the prediction mode information of the neighbor block and the integer pel of the neighbor block.

According to the present invention, the neighbor block includes at least one of a left block, an upper block, an upper right block and an upper left block centering on the current block.

According to the present invention, the method further includes the step of receiving half pel prediction mode information, wherein the half pel generating step is performed based on the half pel prediction mode and wherein the half pel prediction mode information correspond to information for predicting the half pel using the integer pel of the neighbor block.

According to the present invention, the method further includes the step of receiving padding mode information, wherein the half pel generating step further includes padding a pel of the current block using the integer pel of the neighbor block based on the padding mode and generating the half pel using at last one of the pel of the current block and the integer pel of the neighbor block.

According to the present invention, the step of generating the half pel using the at last one of the pel of the current block and the integer pel of the neighbor block is performed using at least one of a vertical filter and a horizontal filter.

To further achieve these and other advantages and in accordance with the purpose of the present invention, an apparatus for processing a video signal includes a half pel generating unit generating a half pel using an integer pel of a neighbor block and a current block reconstructing unit generating a predictor of the current block using the half pel and prediction mode information of the current block.

To further achieve these and other advantages and in accordance with the purpose of the present invention, a method of processing a video signal includes obtaining downsampling mode information, generating a predictor of a current block, downsampling the predictor based on the downsampling mode information, and reconstructing the current block using the downsampled predictor.

According to the present invention, the downsampling mode information includes downsampling direction information and downsampling multiple information.

According to the present invention, the method further includes the step of receiving a residual of the current block, wherein the current block reconstructing step is performed using the residual.

According to the present invention, a block size of the residual is equal to a size of the downsampled predictor.

According to the present invention, the method further includes the step of upsampling the reconstructed current block.

According to the present invention, if the downsampling mode information corresponds to 1/n time in an x-direction, the upsampling step is performed by n times in the x-direction.

To further achieve these and other advantages and in accordance with the purpose of the present invention, an apparatus for processing a video signal includes a downsampling unit obtaining downsampling mode information, the downsampling unit downsampling a predictor of a current block based on the downsampling mode information and a current block reconstructing unit reconstructing the current block using the downsampled predictor.

To further achieve these and other advantages and in accordance with the purpose of the present invention, a method of processing a video signal includes obtaining intra-prediction information including block type information and prediction mode information and generating a predictor of a current block by performing intra-prediction based on the intra-prediction information, wherein the block type includes a type including a homogenous type sub-block and a type including a heterogeneous type sub-block.

According to the present invention, the intra-prediction information obtaining step includes if the current block is set to first sub-blocks, extracting merge flag information if an index i of the first sub-block is a predetermined constant and obtaining the prediction mode information according to the merge flag information, wherein the merge flag information indicates whether the first sub-blocks amounting to $n^2$ are merged into a second sub-block.

According to the present invention, the n is a factor indicating a size difference between the first sub-block and the second sub-block.

According to the present invention, if a size of the first sub-block is U×V, a size of the second sub-block corresponds to one of U×(V·n), (U·n)×(V) and (U·n)×(V·n).

According to the present invention, the step of obtaining the prediction mode information according to the merge flag information includes if the merge flag information indicates that the first sub-blocks are merged into the second sub-block, obtaining the prediction mode information on the second sub-block and if the merge flag information indicates that the first sub-blocks are not merged into the second sub-block, obtaining the prediction mode information on the first sub-blocks amounting to the $n^2$.

According to the present invention, the intra-prediction information obtaining step includes if the current block is set to second sub-blocks, extracting separation flag information on the second sub-blocks and obtaining the prediction mode information according to the separation flag information, wherein the separation flag information indicates whether the second sub-block is separated into the first sub-blocks amounting to $n^2$.

According to the present invention, the step of obtaining the prediction mode information according to the separation flag information includes if the separation flag information indicates that the second sub-block is separated into the first sub-blocks, obtaining the prediction mode information on the first sub-blocks amounting to the $n^2$ and if the separation flag information indicates that the second sub-block is not separated into the first sub-blocks, obtaining the prediction mode information on the second sub-block.

According to the present invention, the video signal is received via a broadcast signal.

According to the present invention, the video signal is received via a digital medium.

To further achieve these and other advantages and in accordance with the purpose of the present invention, an apparatus for processing a video signal includes a prediction information obtaining unit obtaining intra-prediction information including block type information and prediction mode information and a current block reconstructing unit generating a predictor of a current block by performing intra-prediction based on the intra-prediction information, wherein the block type includes a type including a homogenous type sub-block and a type including a heterogeneous type sub-block.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

In the present invention, it is understood that coding should conceptionally include both encoding and decoding.

Meanwhile, a result value of a formula $X/2^n$ (e.g., (A+B)/2, (A+2B+C)/4, etc.) can be rounded off to the nearest whole number in the decimal operation system. In the binary operation system, the formula can be replaced by $(X+2^{n-1})>>2^{n-1}$ (e.g., (A+B+1)>>1, (A+2B+C+2)>>2, etc.).

FIG. 1 is a schematic block diagram of an apparatus for encoding a video signal according to one embodiment of the present invention. Referring to FIG. 1, a video signal encoding apparatus according to one embodiment of the present invention includes a transforming unit 110, a quantizing unit 115, a coding control unit 120, a dequantizing unit 130, an inverse transforming unit 135, a filtering unit 140, a frame storing unit 145, a motion estimating unit 150, an inter-prediction unit 160, an intra-prediction unit 170, and an entropy coding unit 180.

The transforming unit 110 transforms a pixel value and then obtains a transform coefficient value. For this case, DCT (discrete cosine transform) or wavelet transform is usable. The quantizing unit 115 quantizes the transform coefficient value outputted from the transforming unit 110. The coding control unit 120 controls to decide whether to perform intra-picture coding or inter-picture coding on a specific block (or frame). The dequantizing unit 130 and the inverse transforming unit 135 dequantize the transform coefficient value and then reconstruct an original pixel value using the dequantized transform coefficient value.

The filtering unit 140 is applied to each coded macroblock to reduce block distortion. In this case, a filter smoothens edges of a block to enhance an image quality of a decoded picture. And, a selection of this filtering process depends on boundary strength and a gradient of an image sample around a boundary. Filtered pictures are outputted or stored in the frame storing unit 145 to be used as reference pictures.

The motion estimating unit 160 searches a reference picture for a reference block most similar to a current block using the reference pictures stored in the frame storing unit 145. The motion estimating unit 150 delivers information on the searched reference block (e.g., reference picture index information, motion vector information of a difference between a current block and a reference block) to the entropy coding unit 180 to have the delivered information to be included in a bitstream.

The inter-prediction unit 160 performs prediction on a current picture using the reference picture and delivers inter-picture coding information to the entropy coding unit 180. In this case, the inter-picture coding information can include a residual that is a difference between an original current block and a predicted block (predictor).

The intra-prediction unit 170 performs intra-prediction from a decoded sample within the current picture and delivers intra-picture coding information to the entropy coding unit 180. In particular, the intra-prediction unit 170 predicts a current block using a pixel of a block neighbor to the current block within a current picture and generates a residual that is a difference between an original current block an a predicted block. First to third embodiments for the intra-prediction unit 170 will be described in detail with reference to the accompanying drawings later.

The entropy coding unit 180 generates a video signal bitstream by performing entropy coding on a quantized transform coefficient value, intra-picture coding information and inter-picture coding information. In this case, the entropy coding unit 180 is able to use variable length coding (VLC) and arithmetic coding. The variable length coding (VLC) transforms inputted symbols into continuous codeword. And, a length of the codeword may be variable. For instance, frequently generated symbols are represented as a short codeword, whereas non-frequently generated symbols are represented as a long codeword. Context-based adaptive variable length coding (CAVLC) is usable as variable length coding. The arithmetic coding transforms continuous data symbols into a single prime number. And, the arithmetic coding is able to obtain an optimal prime bit required for representing each symbol. Context-based adaptive binary arithmetic code (CABAC) is usable for arithmetic coding.

Figure 2:
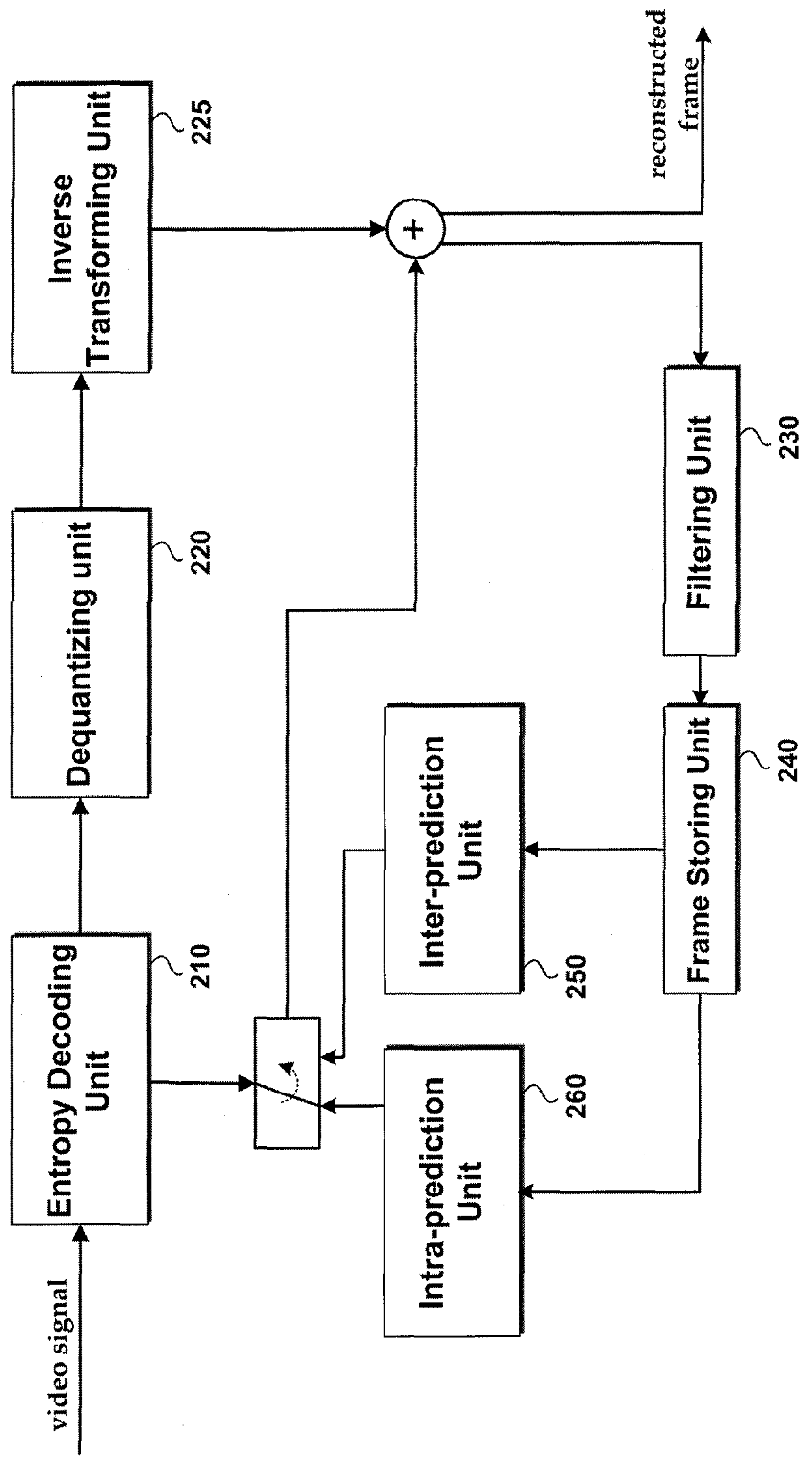
FIG. 2 is a schematic block diagram of a video signal decoding apparatus according to one embodiment of the present invention.

FIG. 2 is a schematic block diagram of a video signal decoding apparatus according to one embodiment of the present invention.

Referring to FIG. 2, a video signal decoding apparatus according to one embodiment of the present invention includes an entropy decoding unit 210, a dequantizing unit 225, an inverse transforming unit 225, a filtering unit 230, a frame storing unit 240, an inter-prediction unit 260, and an intra-prediction unit 260.

The entropy decoding unit 210 entropy-decodes a video signal bitstream and then extracts a transform coefficient of each macroblock, a motion vector and the like. The dequantizing unit 220 dequantizes an entropy-decoded transform coefficient, and the inverse transforming unit 225 reconstructs an original pixel value using the dequantized transform coefficient. Meanwhile, the filtering unit 230 is applied to each coded macroblock to reduce block distortion. Filter smoothens edges of a block to improve an image quality of a decoded picture. The filtered pictures are outputted or stored in the frame storing unit 240 to be used as reference pictures.

The inter-prediction unit 250 predicts a current picture using the reference pictures stored in the frame storing unit 240. In doing so, it is able to use the inter-picture prediction information (reference picture index information, motion vector information, etc.) delivered from the entropy decoding unit 210.

The intra-prediction unit 260 performs intra-picture prediction from a decoded sample within a current picture. First to third embodiments for the intra-prediction unit 260 will be described in detail with reference to the accompanying drawings later as well. A predicted value outputted from the intra-prediction unit 260 or the inter-prediction unit 250 and a pixel value outputted from the inverse transforming unit 225 are added together to generate a reconstructed video frame.

In the following description, first to third embodiments for the intra-prediction unit 170 of the encoding apparatus and the intra-prediction unit 260 of the decoding apparatus are explained. In particular, the first embodiment is explained with reference to FIGS. 3A to 15, the second embodiment is explained with reference to FIGS. 16A to 19C, and the third embodiment is explained with reference to FIGS. 20A to 24B.

1. Intra-Prediction Using Half Pel

Figure 3A:
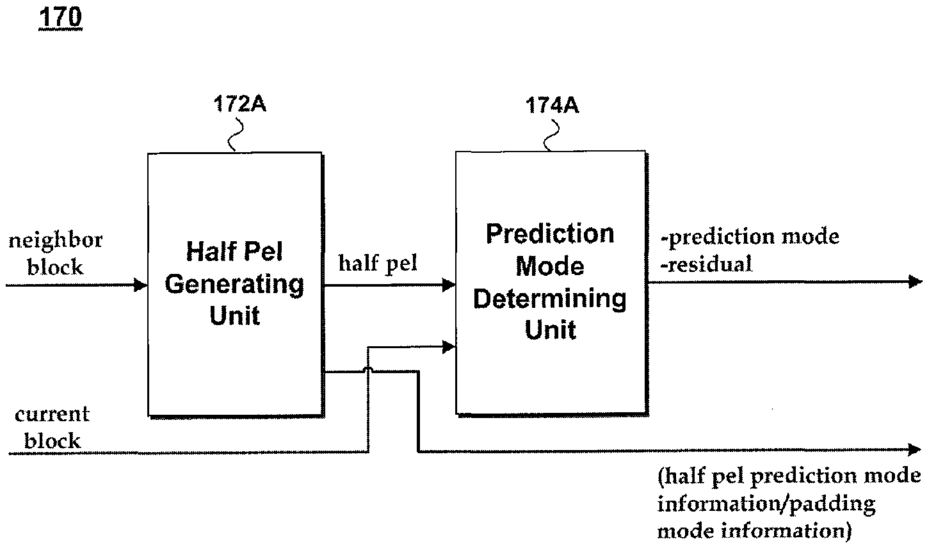
FIG. 3A is a block diagram of an intra-prediction unit of a video signal encoding apparatus according to a first embodiment of the present invention.
Figure 3B:
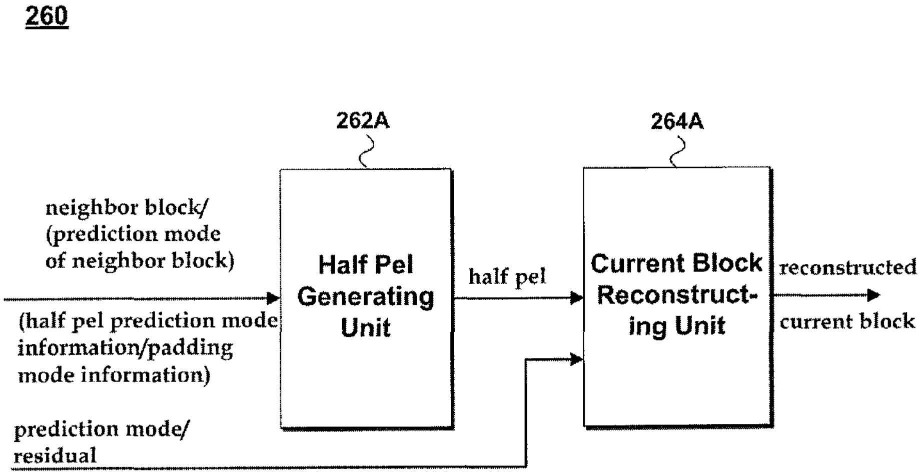
FIG. 3B is a block diagram of an intra-prediction unit of a video signal decoding apparatus according to a first embodiment of the present invention.
Figure 4:
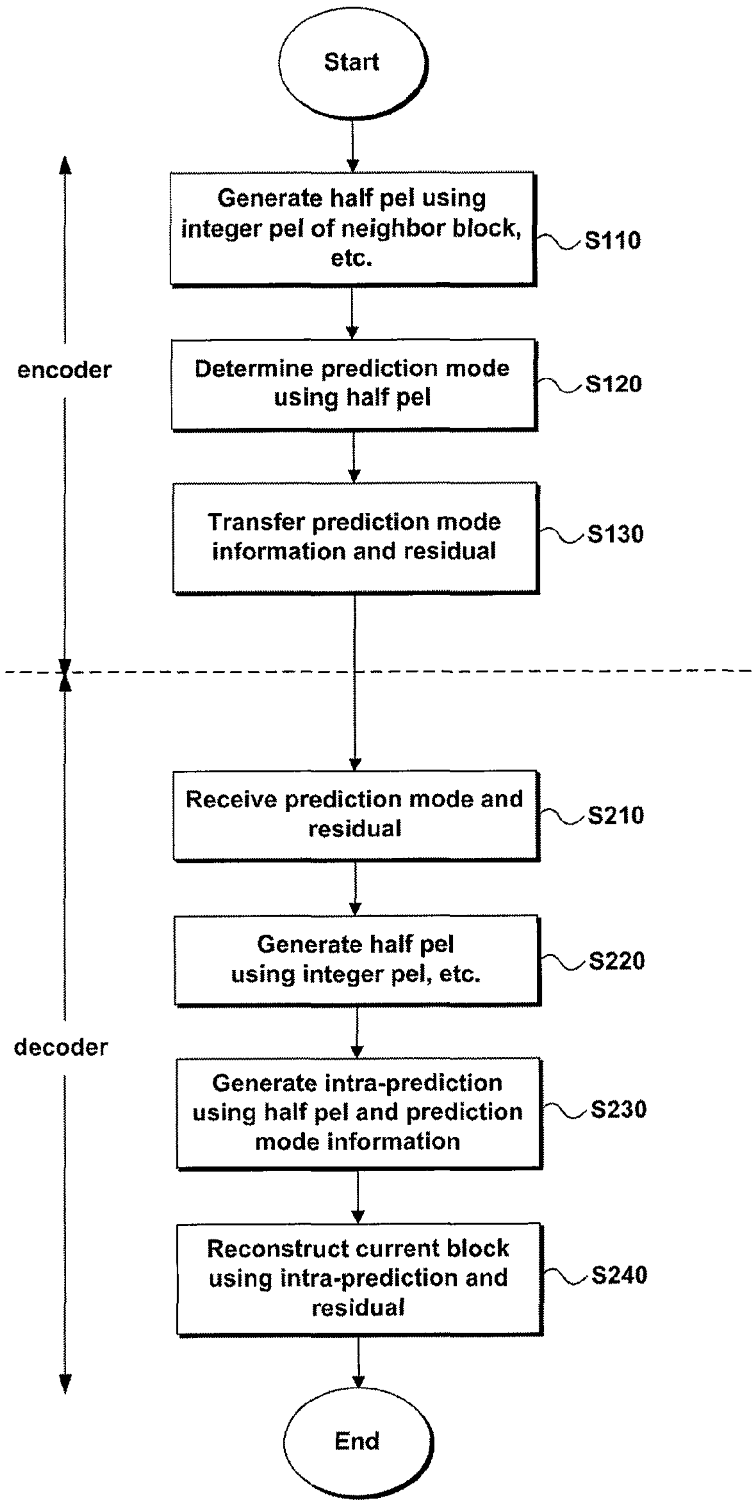
FIG. 4 is a flowchart of an intra-prediction process in a video signal encoding method and a video signal decoding method according to a first embodiment of the present invention.
Figure 5:
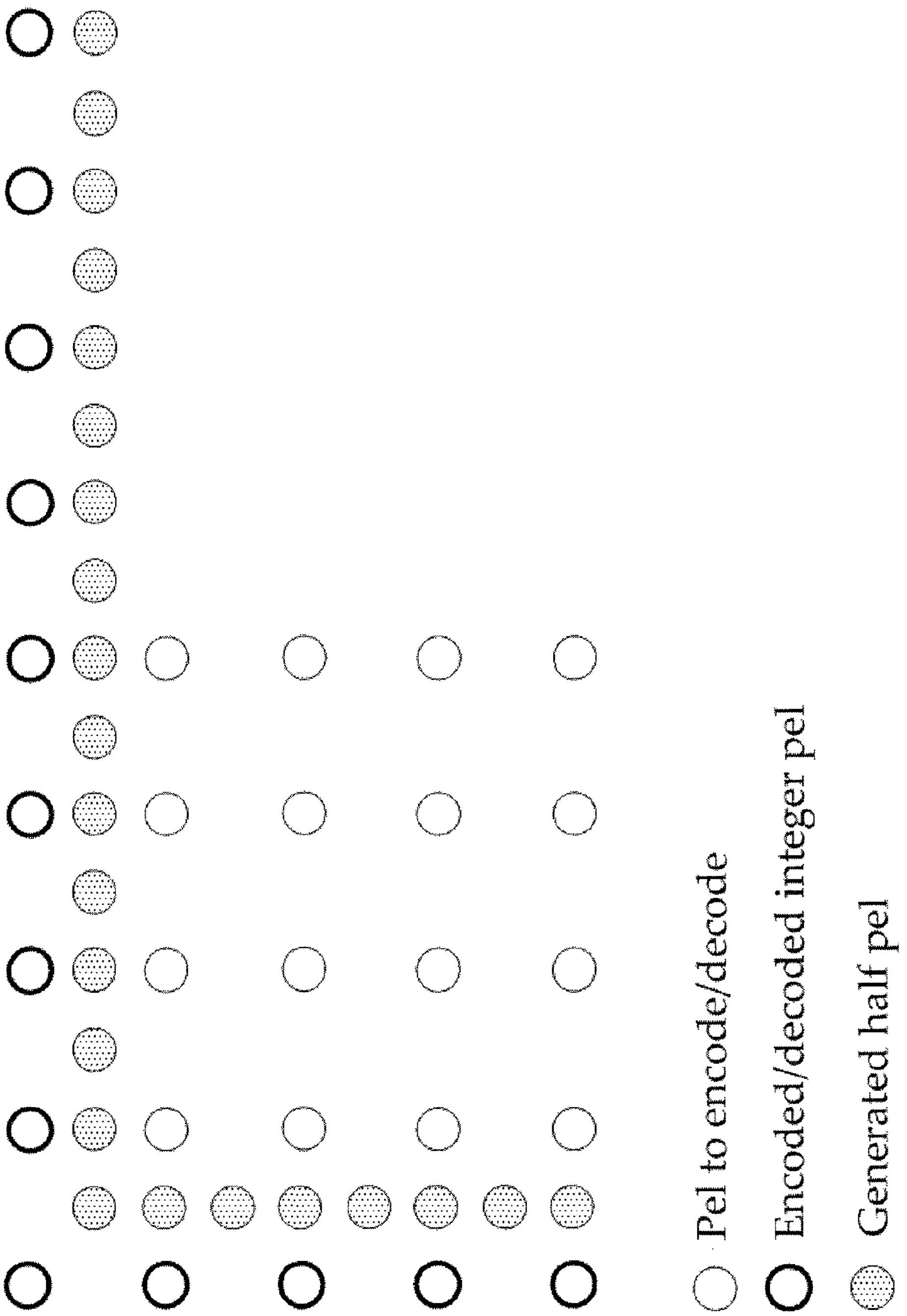
FIG. 5 is a diagram for explaining a position of a half pel.

FIG. 3A is a block diagram of an intra-prediction unit of a video signal encoding apparatus according to a first embodiment of the present invention, and FIG. 3B is a block diagram of an intra-prediction unit of a video signal decoding apparatus according to a first embodiment of the present invention. FIG. 4 is a flowchart of an intra-prediction process in a video signal encoding method and a video signal decoding method according to a first embodiment of the present invention. And, FIG. 5 is a diagram for explaining a position of a half pel.

First of all, referring to FIGS. 3A and 4, a half pel generating unit 172A of the intra-prediction unit 170 generates a half pel using information of a neighbor block (integer pel information of neighbor block, prediction mode information of neighbor block) [S110]. One example of the half pel is shown in FIG. 5. Referring to FIG. 5, there exist pels, which are to be encoded or decoded, of a current block. And, integers, which are already encoded or decoded, are located neighbor areas (left, upper, upper right) of the pels. And, it can be observed that half pels are located between the pels of the current block and the integer pels of the neighbor block. If a position of a upper left pel of the current block is (0, 0), a position of the half pel can be calculated from the following formula.

$$\text{Half pel}(x,y)=(m/c,n/c) \qquad \text{[Formula 1]}$$

In Formula 1, at least one of 'm' and 'n' is −1 and 'c' is a constant.

Like the integer pels, the half pels exist in left, upper and upper right areas of the current block. Meanwhile, total 13 integer pels of the neighbor block can exist. Yet, since the half pels have high resolution in vertical and horizontal directions, 23 half pels, which are 10 more than the number of the integer pels, may exist. And, the present invention is non-limited to this example. First to fourth embodiments (steps S110-1 to S110-4) for the step of generating the half pels by the half pel generating unit 172A will be explained with reference to FIGS. 7 to 15 later.

In the step S110, half pel prediction mode information (S110-3, third embodiment) and padding mode information (S110-4, fourth embodiment) can be further generated as well as the prediction mode information, which will be explained in detail later.

A prediction mode determining unit 174B determines a prediction mode of a current block using the half pels and the like generated in the step S110 [S120]. In this case, the prediction mode means such a prediction direction as one of various directions for prediction using half pels of left, upper and upper right areas. For instance, pels in a left direction (i.e., a half pel having the same y-component of a random pel of a current block) are usable for prediction of a pel of a current block or pels in a upper direction (i.e., a half pel having the same x-component of a random pel of a current block) are usable for prediction of a pel of a current block. Hence, the prediction mode means such directions. Total nine prediction modes (modes 0 to 8) can exist if a current block is a 4×4 block. Examples for the prediction modes are shown in FIGS. 6A to 6I.

Figure 6A:
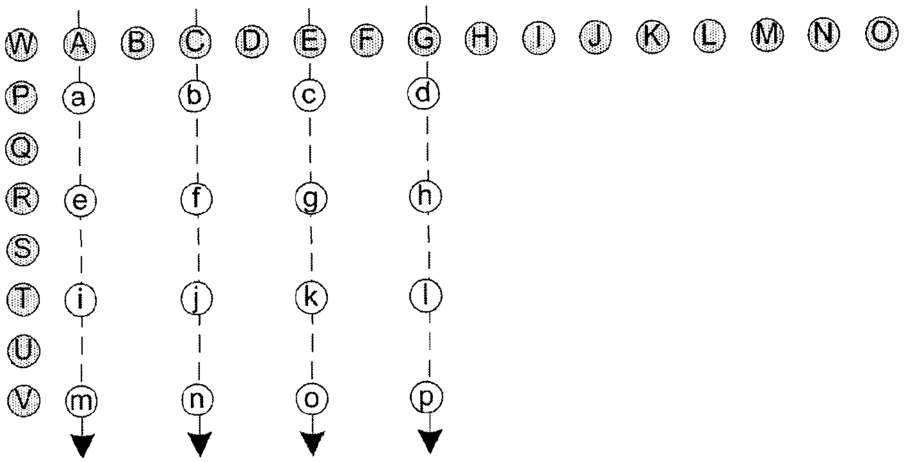
FIGS. 6A to 6I are exemplary diagrams for prediction modes (mode 0 to mode 8) in case that a current block is a 4×4 bock.
Figure 6B:
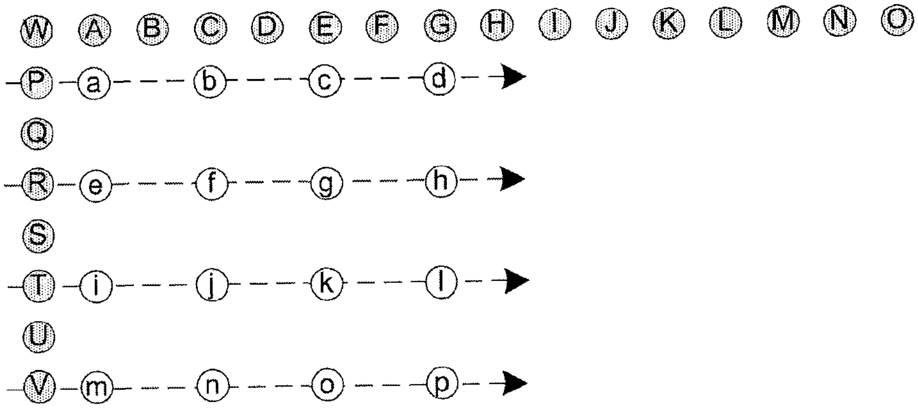
Figure 6C:
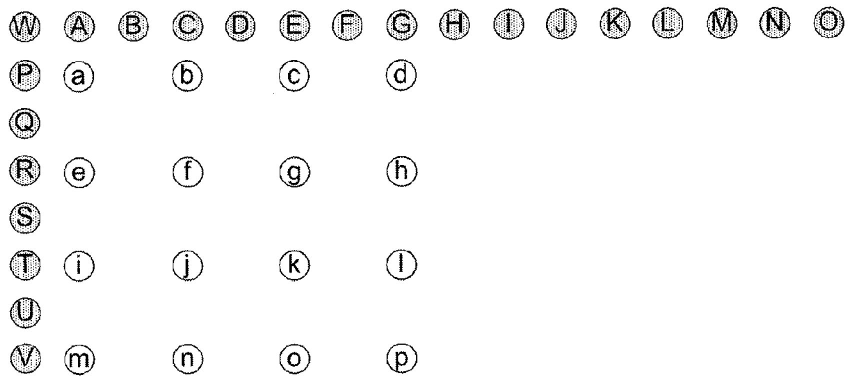
Figure 6D:
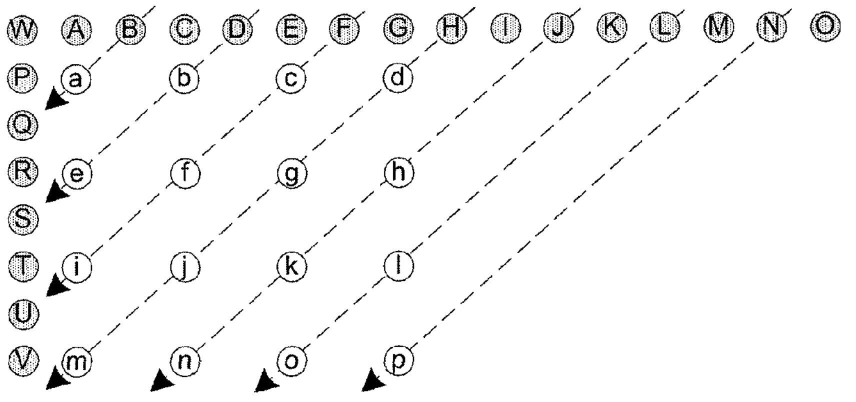
Figure 6E:
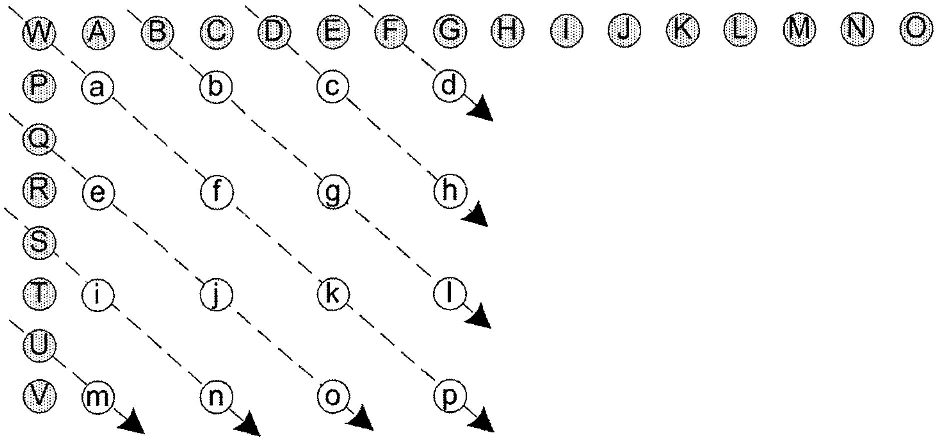
Figure 6F:
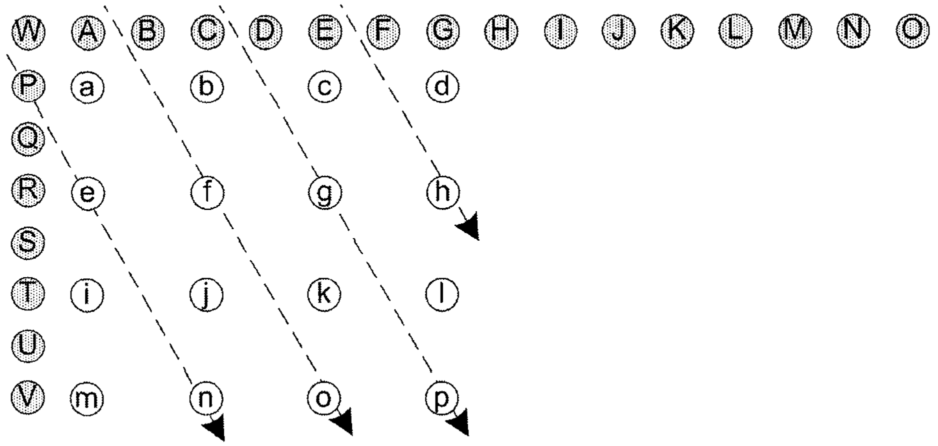
Figure 6G:
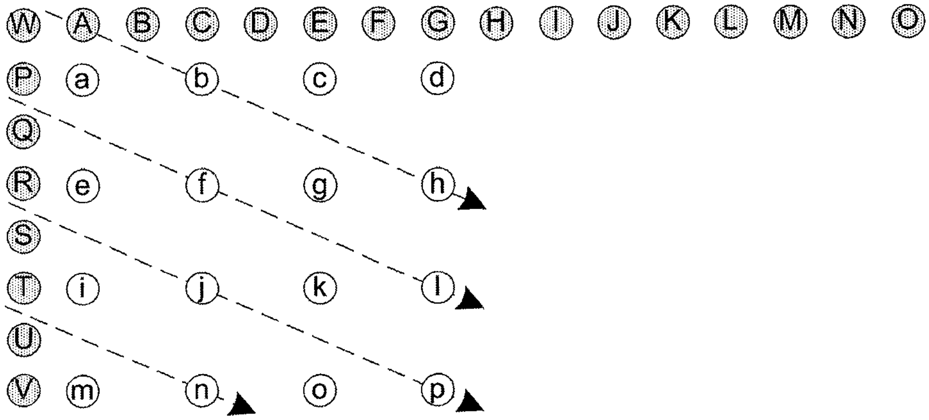
Figure 6H:
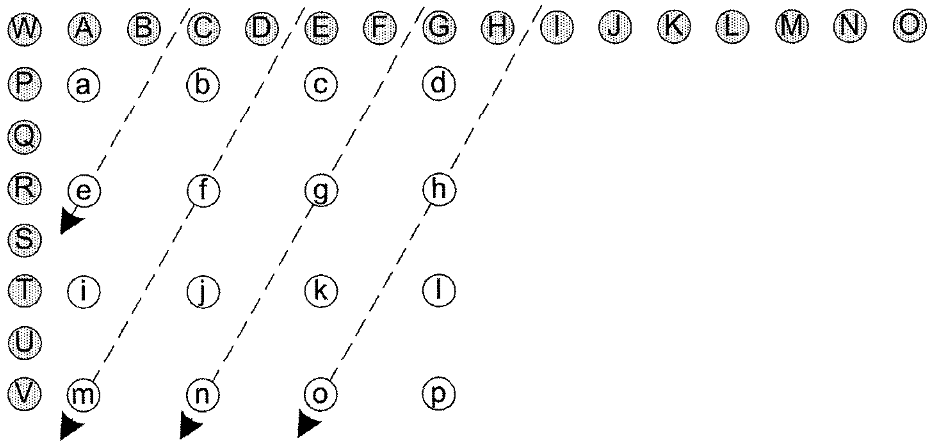
Figure 6I:
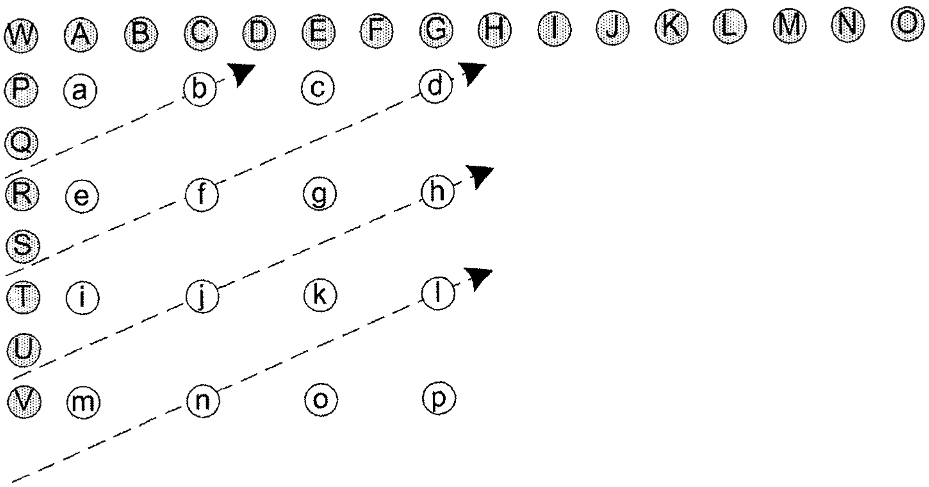

Referring to FIG. 6A, half pels A to W exist neighbor to pels a to p of a current block. In case that a prediction mode is mode 0, it means a vertical direction. And, a predicted value of the pel (a, e, i or m) of the current block becomes the half pel (e.g., A) above the corresponding pel. In this case, it is special in that the half pels A to W are used instead of integer pels (not shown in the drawing). FIGS. 6B to 6I show modes 1 to 8, respectively. Meanwhile, all of the modes 0 to 8 shown in FIGS. 6A to 6I are usable. And, it is a matter of course that the modes 0 to 8 are usable in part as well. The modes shown in FIG. 6A to 6I are relevant to the case that the current block is a 4×4 block only. Moreover, the modes 0 to 8 can exist in case that the current block is a 16×16 block. In this case, the modes 0 to 8 can exist in part as well.

Meanwhile, in the step S120, it is able to determine a prediction mode a current block using integer pels as well as the half pels. In particular, by comparing a result of the half pel using case to a result of the integer pel using case, it is considered which case is mode advantageous. And, a final selection can be then made. In case that using the integer pels is more advantageous, information indicating that the prediction mode was determined using the integer pels instead of the half pels is included in a bitstream. Otherwise, if using the half pels is determined as more advantageous, information indicating that the prediction mode was determined using the half pels can be included in a bitstream.

Referring now to FIG. 3A and FIG. 4, the prediction mode determining unit 174B generates a residual corresponding to a difference between the block (predictor) predicted according to the prediction mode information determined in the step S120 and the current block, has both of the prediction mode information and the residual included in the bitstream, and then transfers the corresponding bitstream to the decoding apparatus [S130].

Referring to FIG. 3B and FIG. 4, the decoding apparatus (the entropy decoding unit thereof) receives the prediction mode information and the residual [S210]. In this case, as mentioned in the foregoing description, half pel prediction mode information and padding mode information can be further received. A half pel generating unit 262A of the intra-prediction unit 260 of the decoding apparatus generates half pels using integer pels of a neighbor block and the like [S220]. First to fourth embodiments S220-1 to S220-4 for a process for the half pel generating unit 262A of the decoding apparatus to generate half pels will be explained later.

A current block reconstructing unit 262A generates a prediction of the current block using the half pels generated in the step S220 and the prediction mode received in the step S210 [S230] and then reconstructs the current block using the generated prediction and the transferred residual [S240].

1-1. Various Schemes for Generating Half Pels

Figure 7:
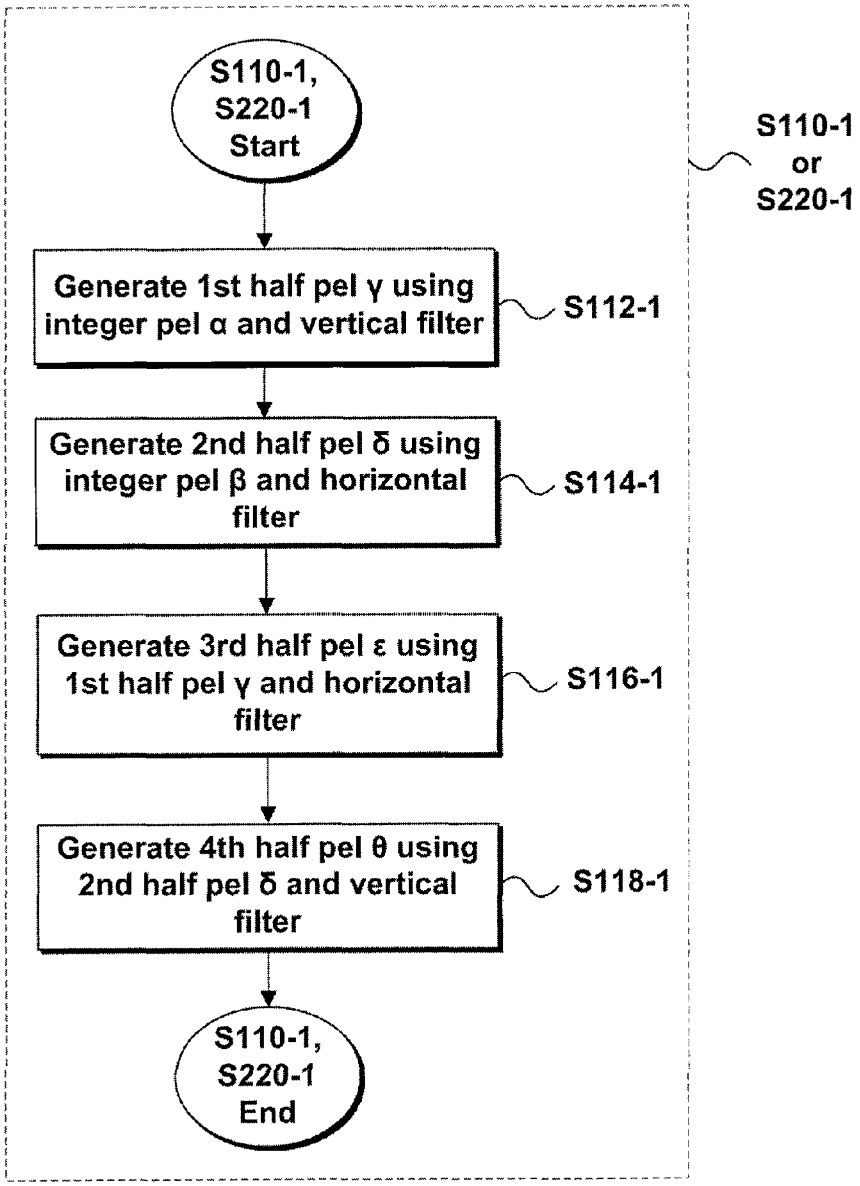
FIG. 7 is a flowchart of a half pel generating step according to a first embodiment of the present invention.

In the following description, first to fourth embodiments of a process for generating a half pel in the steps S110 and S220 are explained in sequence. In particular, the first embodiment (S110-1, S220-1) will be explained with reference to FIGS. 7 to 8D, the second embodiment (S110-2, S220-2) will be explained with reference to FIG. 9 and FIG. 10, the third embodiment (S110-3, S220-3) will be explained with reference to FIG. 11 and FIG. 12, and the fourth embodiment (S110-4, S220-4) will be explained with reference to FIGS. 13 to 15, (1) First Scheme FIG. 7 is a flowchart of a first embodiment (S110-1, S220-1) of a half pel generating step. And, FIGS. 8A to 8D are diagrams to sequentially represent a process for generating a half pel according to the first embodiment shown in FIG. 7.

First of all, referring to FIG. 7, an encoding apparatus generates a first half pel $\gamma$ using an integer pel of a neighbor block and a vertical filter [S112-1].

Figure 8A:
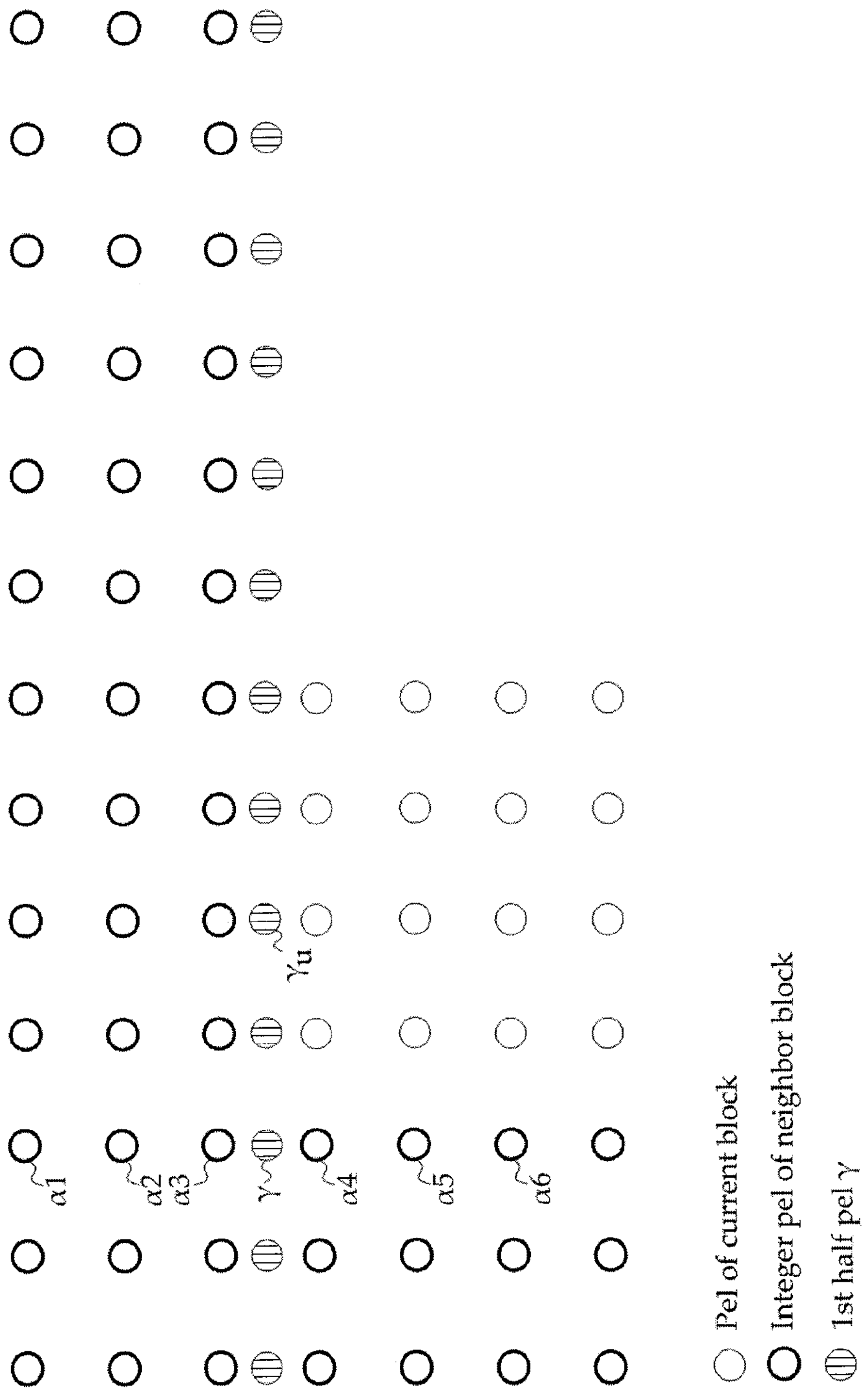
FIGS. 8A to 8D are diagrams to sequentially represent a process for generating a half pel according to the first embodiment shown in FIG. 7.

Referring to FIG. 8A, there exist a pel of a current block and integer pels of a neighbor block. The first half pel $\gamma$ is the half pel located above a current pel in a horizontal direction. If a position of an upper left pel is (0, 0), a position of the first half pel $\gamma$ can be expressed as Formula 2.

First half pel$(x,y)=(m/2,-\frac{1}{2})$, where '$m$' is an even number. [Formula 2]

In order to generate the first half pel $\gamma$, it is able to use integer pels $\alpha_1$~$\alpha_6$ in a vertical direction and a filter. In this case, the filter may include a 6-tab filter having coefficients of {1, −5, 20, 20, −5, 1} or an average filter, by which examples of the present invention are non-limited. Meanwhile, in generating a first half pel $\gamma_u$ located right above a pel of a current block, since a pel below the first half pel $\gamma_u$ is the pel of the current block, it is not available. Instead, it is able to use a nearest pel (e.g., $\alpha_4$~$\alpha_6$) among integer pels of the neighbor block.

Figure 8B:
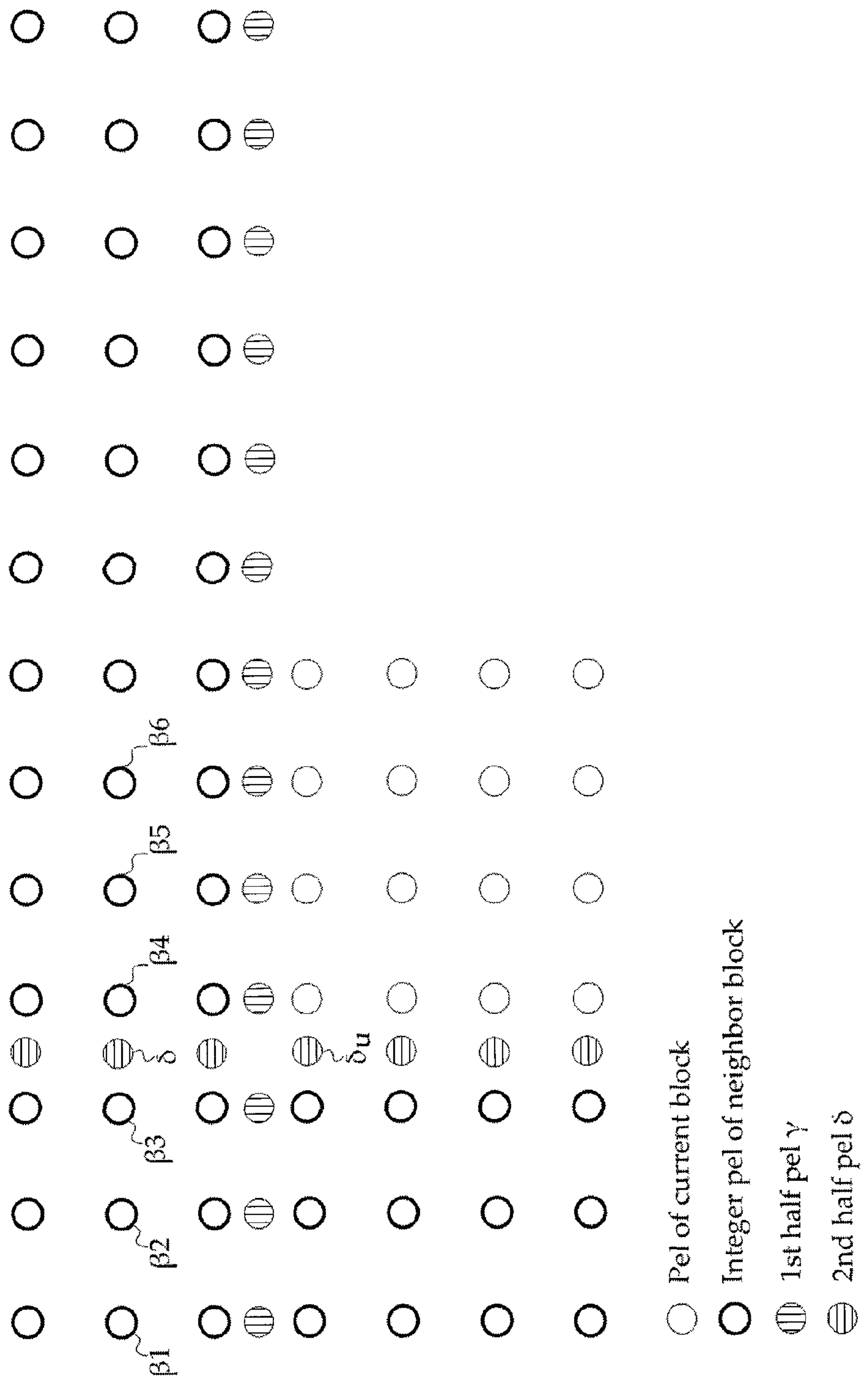

Subsequently, a second half pel $\delta$ is generated using an integer pel in a horizontal direction and a horizon filter [S114-1]. Referring to FIG. 8B, integer pels $\beta_1$~$\beta_6$ in the horizontal direction among the integer pels of the neighbor block are displayed.

The second half pel $\delta$ is the half pel located in a vertical direction left to a current block. If a position of an upper left pel of the current block is (0, 0), a position of the second half pel $\delta$ can be expressed as Formula 3.

Second half pel$(x,y)=(-\frac{1}{2},-n/2)$, where '$m$' is an even number. [Formula 3]

In order to generate the second half pel $\gamma$, it is able to use integer pels $\beta_1$~$\beta_6$ in a horizontal direction and a horizontal filter. Likewise, in this case, in generating the a half pel $\delta_u$ located right left to a pel of a current block, since a pel right to the second half pel $\delta_u$ is the pel of the current block, it is not available. Instead, it is able to use a nearest pel (e.g., ($\beta_1$~$\beta_6$) among integer pels of the neighbor block. In this case, since the step S114-1 does not use the result of the step S112-1, it can be executed prior to the step S112-1 or can be simultaneously executed together with the step S112-1.

Figure 8C:
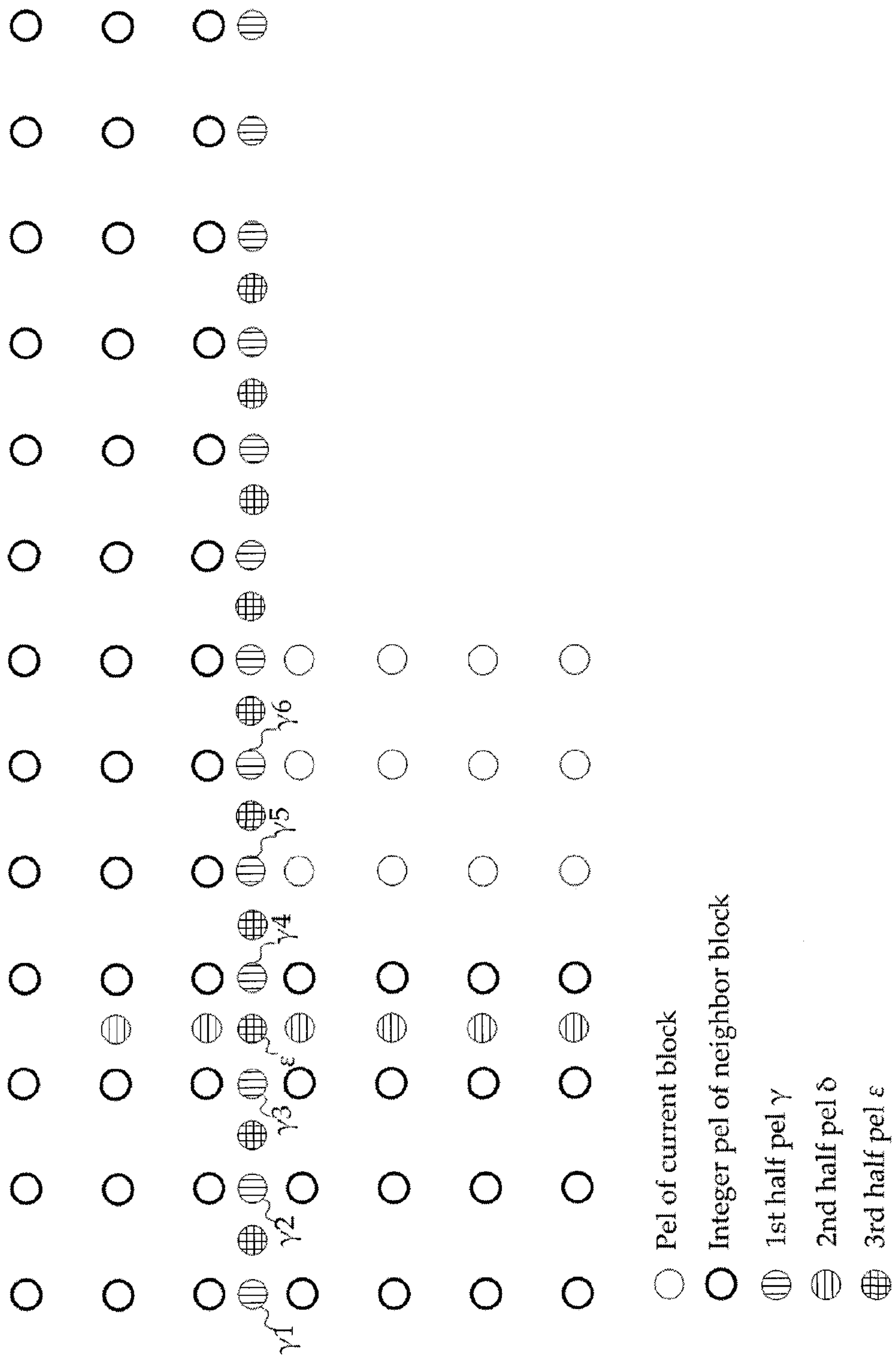

A third half pel $\epsilon$ is generated using the first half pel $\gamma$ generated in the step S112-1 and the horizontal filter [S116-1]. Referring to FIG. 8C, it can be observed that the third half pel $\epsilon$ is located between the first half pels $\gamma$. If a position of an upper left pel of the current block is (0, 0), a position of the third half pel $\epsilon$ can be expressed as Formula 4.

Third half pel$(x,y)=(m/2,-\frac{1}{2})$, where '$m$' is an odd number. [Formula 4]

In generating the third half pel $\epsilon$, it is able to use first half pels $\gamma_1$~$\gamma_6$ in the horizontal direction and the horizontal filter.

Figure 8D:
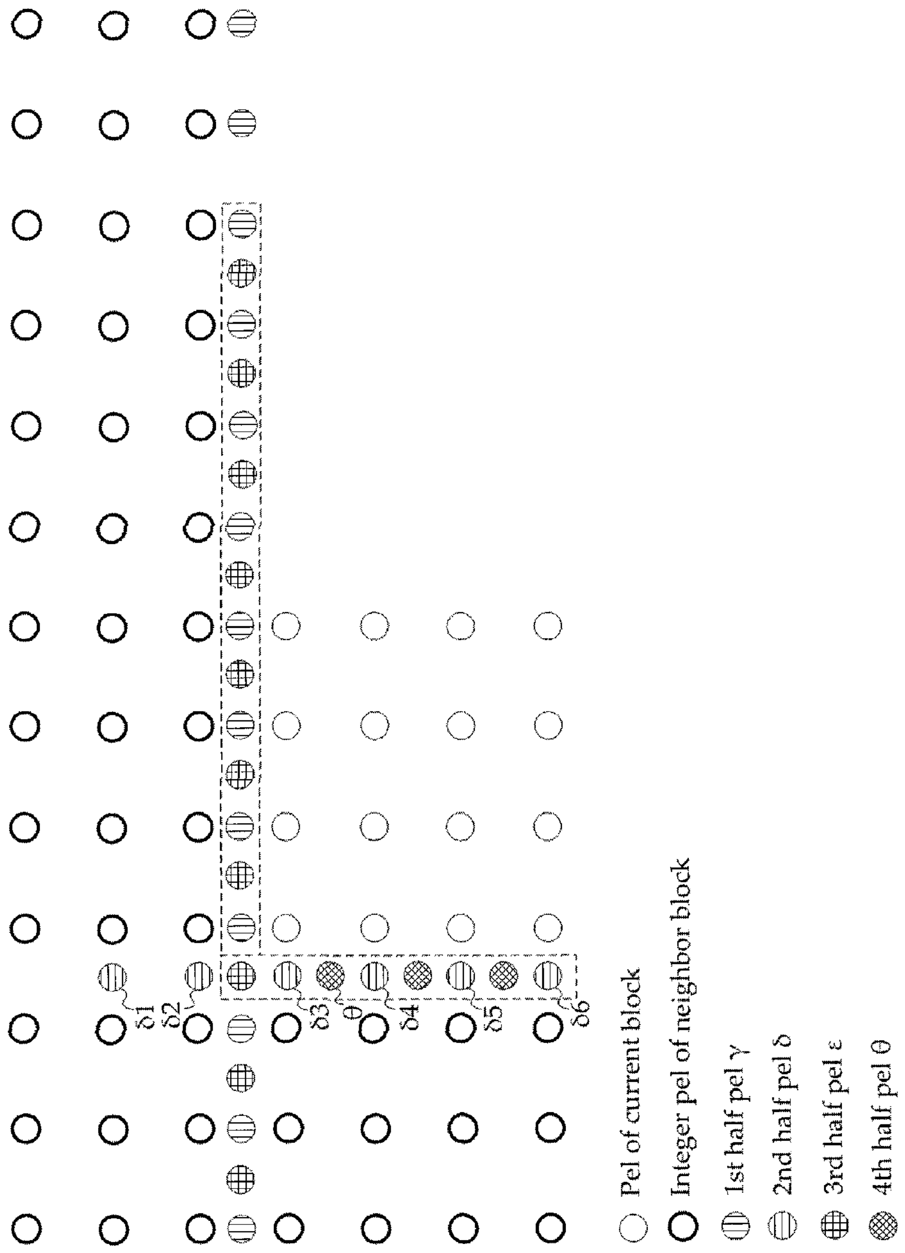

Finally, a fourth half pel $\theta$ is generated using the second half pel $\delta$ generated in the step S114-1 and the vertical filter [S118-1]. Referring to FIG. 8D, it can be observed that the fourth half pel $\theta$ is located between the second half pels $\delta$. If a position of an upper left pel of the current block is (0, 0), a position of the fourth half pel $\theta$ can be expressed as Formula 5.

Fourth half pel$(x,y)=(-\frac{1}{2},-n/2)$, where '$n$' is an odd number. [Formula 5]

In generating the fourth half pel $\theta$, it is able to use second half pels $\delta_1$~$\delta_6$ in the vertical direction and the vertical filter.

Likewise, the step S118-1 can be executed prior to the step S116-1 or can be simultaneously executed together with the step S116-1. Thus, the half pels of the left, upper and upper right area of the current block are generated. It is able to know that the half pels are the set of the first to fourth half pels. Some of the first and second half pels are used for the generation of the third and fourth half pels and the rest become the final half pels.

Moreover, according to the first embodiment, the half pel generating step S220-1 executed in the decoding process includes the steps S112-1 to S118-1 in the same manner of the half pel generating step S110-1 of the encoding process.

(2) Second Scheme

Figure 9:
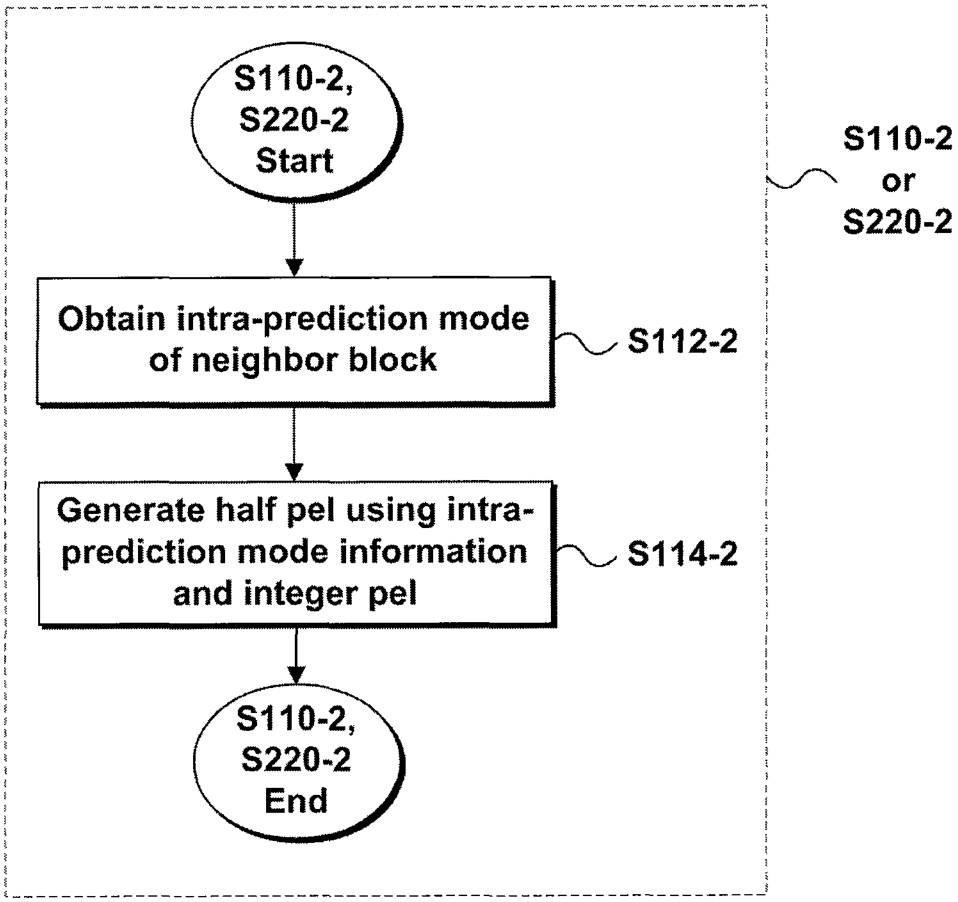
FIG. 9 is a flowchart for a half pel generating step according to a second embodiment of the present invention.
Figure 10:
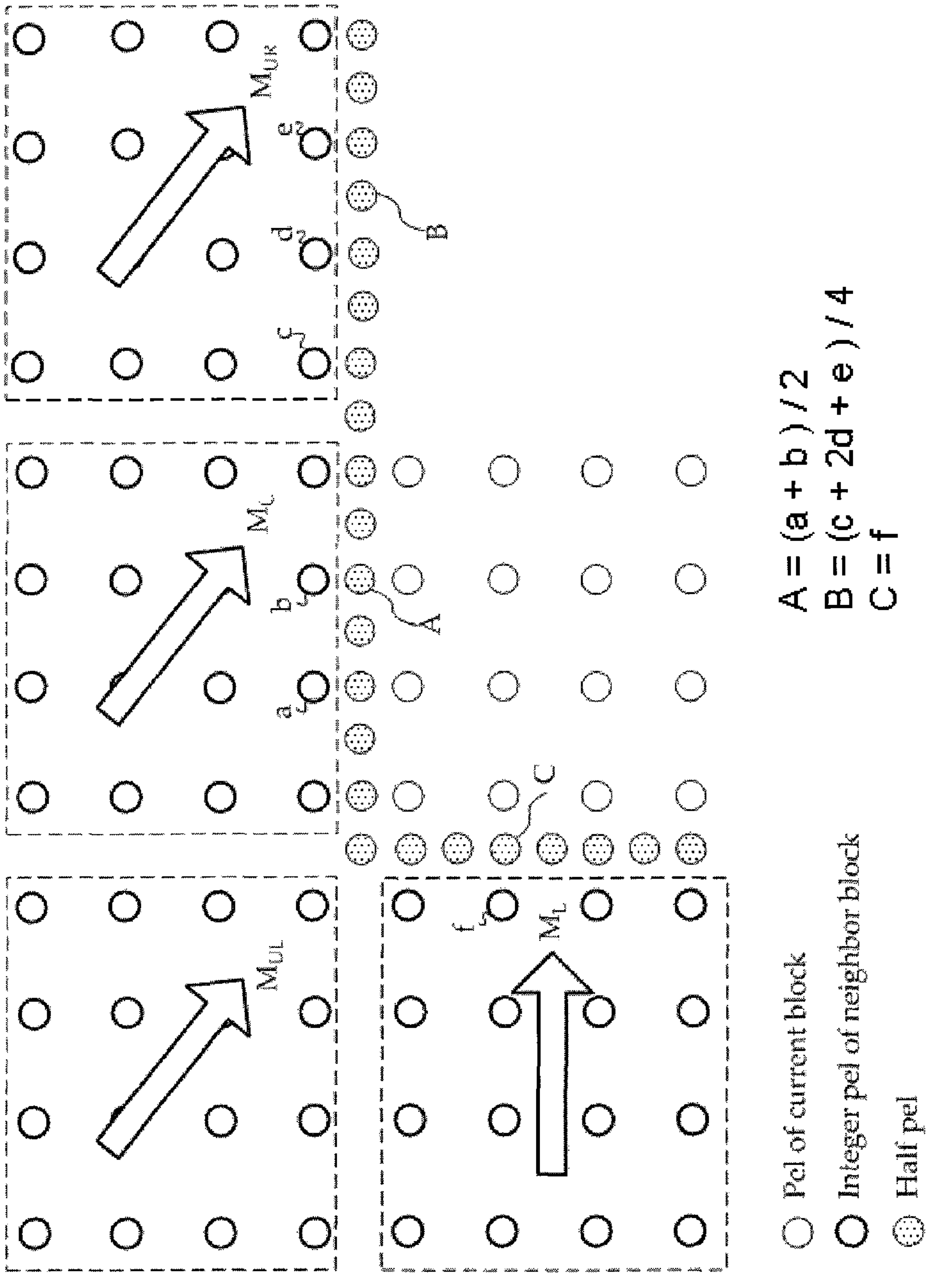
FIG. 10 is a diagram for explaining the second embodiment shown in FIG. 9.

FIG. 9 is a flowchart for a half pel generating step according to a second embodiment of the present invention, and FIG. 10 is a diagram for explaining the second embodiment shown in FIG. 9. First of all, referring to FIG. 9, an encoding apparatus obtains intra-prediction mode information of a neighbor block [S112-2]. Referring to FIG. 10, there exist neighbor blocks (left block, upper block, upper right block and upper left block) of a current block. And, each of the neighbor blocks has a prediction mode for intra-prediction. It can be observed that the prediction mode $M_L$ of the left block corresponds to a horizontal direction ('mode 1' for the cases shown in FIGS. 6A to 6I). And, it can be observed that all of the prediction mode $M_U$ of the upper block, the prediction mode $M_{UR}$ of the upper right block and the prediction mode $M_{UL}$ of the upper left block correspond to a diagonal down right direction ('mode 4' for the cases shown in FIGS. 6A to 6I).

Thus, half pels are generated using the prediction mode information of the neighbor blocks, which is obtained in the step S112-2, and the integer pels [S114-2]. In the case shown in FIG. 10, since the prediction mode Mu of the upper block, which is the block nearest to a half pel A, is in the diagonal down right direction, it is able to generate the half pel A using a pel b at a point (0, −½) and a pel a at a point (−1, −½) with reference to the half pel A. In particular, an average value of the two pels a and b may correspond to the half pel A. Meanwhile, since the prediction mode $M_{UR}$ of the upper right block is in the diagonal down right direction, it is able to generate the half pel B using a pel e at a point (½, −½), a pel d at a point (−½, −½), and a pel c at a point (−3/2, −½) with reference to the half pel B. In particular, by applying a weight to the pel b at the point corresponding to the diagonal direction, it is able to generate the half pel B according to Formula of '$B=(c+2d+e)/4$'. Besides, since the prediction mode $M_L$ of the left block, which is the block nearest to a half pel C, is in the horizontal direction, it is able to generate the half pel C using a pel f in a left direction. In particular, the pel f at the left point can be taken as a value of the half pel C as it is.

According to the second embodiment, the half pel generating step S220-2 executed in the decoding process includes the steps S112-2 to S114-2 in the same manner of the half pel generating step S110-2 executed in the encoding process.

The above-explained scheme for generating the half pel using the prediction mode of the neighbor block adopt the information required for the prediction of the neighbor block and needs not to define a separate syntax element. Therefore, this scheme is characterized in generating the half pel without increasing bits.

(3) Third Scheme

Figure 11:
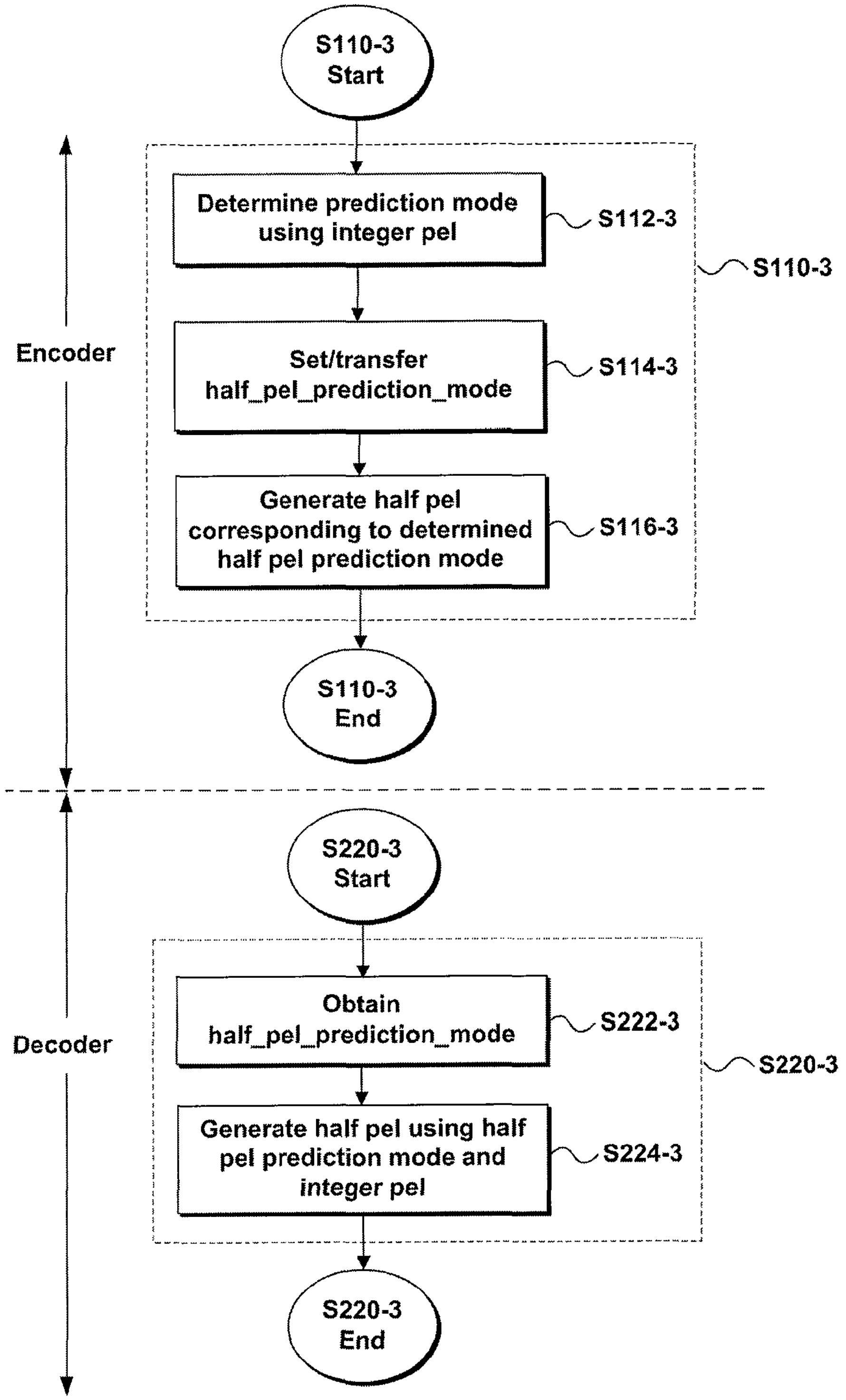
FIG. 11 is a flowchart for a half pel generating step according to a third embodiment of the present invention.
Figure 12:
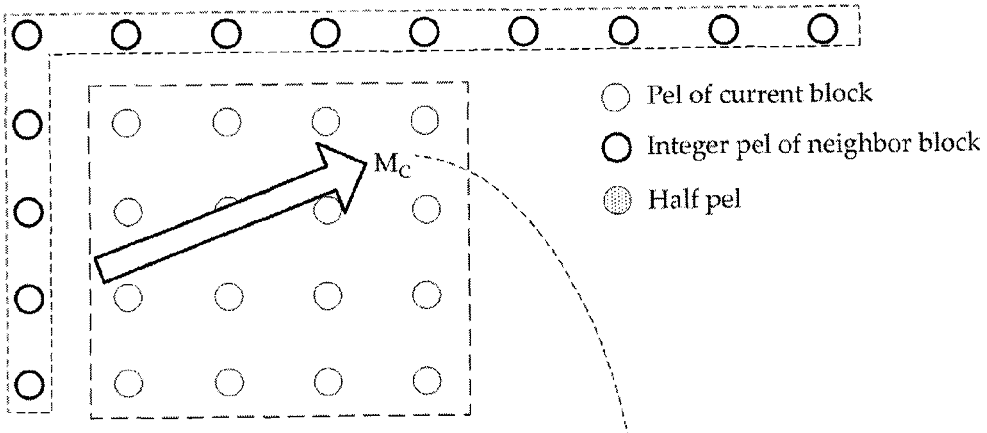
FIG. 12 is a diagram for explaining the third embodiment shown in FIG. 11.
Figure 12:
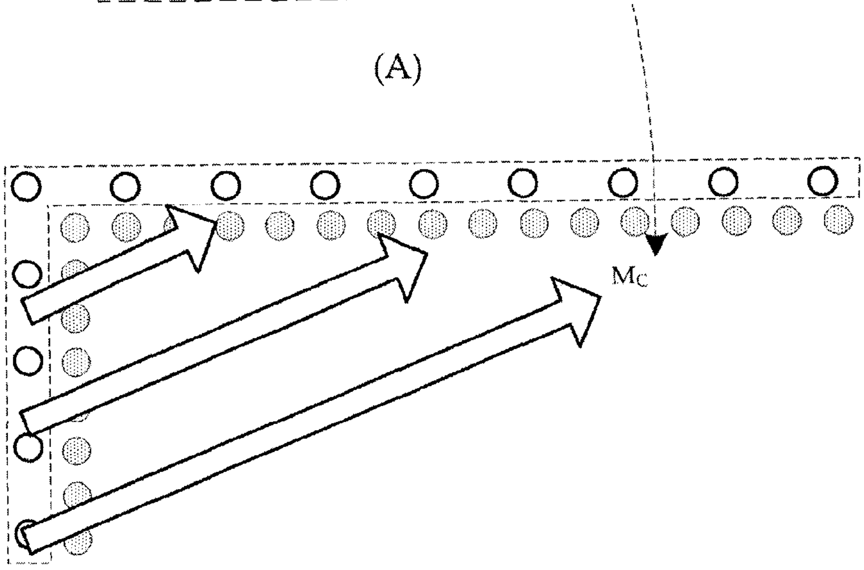

FIG. 11 is a flowchart for a half pel generating step according to a third embodiment of the present invention, and FIG. 12 is a diagram for explaining the third embodiment shown in FIG. 11. First of all, referring to FIG. 11, an encoding apparatus determines a prediction mode of a current block using an integer pel [S112-3]. Referring to (A) of FIG. 12, in predicting the current block using integer pels of a neighbor block, an appropriate prediction direction is determined and a prediction mode $M_c$ is then determined in the determined direction. In determining the appropriate prediction direction, it is able to consider a bit quantity (RD cost) consumed for coding a residual (a difference between a current block and a predicted block corresponding to a prediction direction).

Since the step S112-3 uses integer pels instead of using half pels, it differs from the former step S120 (the step of determining the prediction mode of the current block using half pels) explained with reference to FIG. 4. Moreover, this prediction mode differs in being used to generate half pels instead of being used to predict the current block.

With regard to the prediction mode determined in the step S112-3, the prediction mode of the current block is set to a half pel prediction mode (half_pel_prediction_mode) [S114-3]. The half pel prediction mode (half_pel_prediction_mode) means a prediction direction in predicting a half pel using an integer pel of a neighbor block. In the step S114-3, the prediction mode of the current block is set to the half pel prediction mode, which is because a direction for predicting a pel of a current block using an integer pel may be similar to a direction for predicting a half pel using an integer pel of a neighbor block.

Meanwhile, the half pel prediction mode (half_pel_prediction_mode) can be defined as the following table. And, it is understood that nine modes represented in the following table may be partially included.

TABLE 1

Value and Meaning of half pel prediction mode (half_pel_prediction_mode)

| half pel prediction mode (half_pel_prediction_mode) | Meaning |
|---|---|
| 0 | Vertical |
| 1 | Horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |

The half pel prediction mode (half_pel_prediction_mode) determined in the step S114-3 is transferred to a decoding apparatus by being included in a bitstream.

Subsequently, a half pel corresponding to the half pel prediction mode determined in the step S114-3 is generated [S116-3]. The scheme for generating a half pel according to each prediction mode may be the same as shown in FIGS. 6A to 6I. Referring to (B) of FIG. 12, since the half pel prediction mode determined in (A) of FIG. 12 is a horizontal up direction (Mode8), the half pel is generated in a manner that an integer pel is inserted in the horizontal up direction (Mode8).

Meanwhile, the decoding apparatus obtains the half pel prediction mode (half_pel_prediction_mode) from the bitstream [S222-3]. Subsequently, a half pel is generated using the obtained half pel prediction mode and an integer pel of a neighbor block [S224-3]. Since the decoding apparatus uses the transferred half pel information, complexity of a process for generating a half pel separately may be lower than that of the process by the encoding apparatus.

(4) Fourth Scheme

Figure 13:
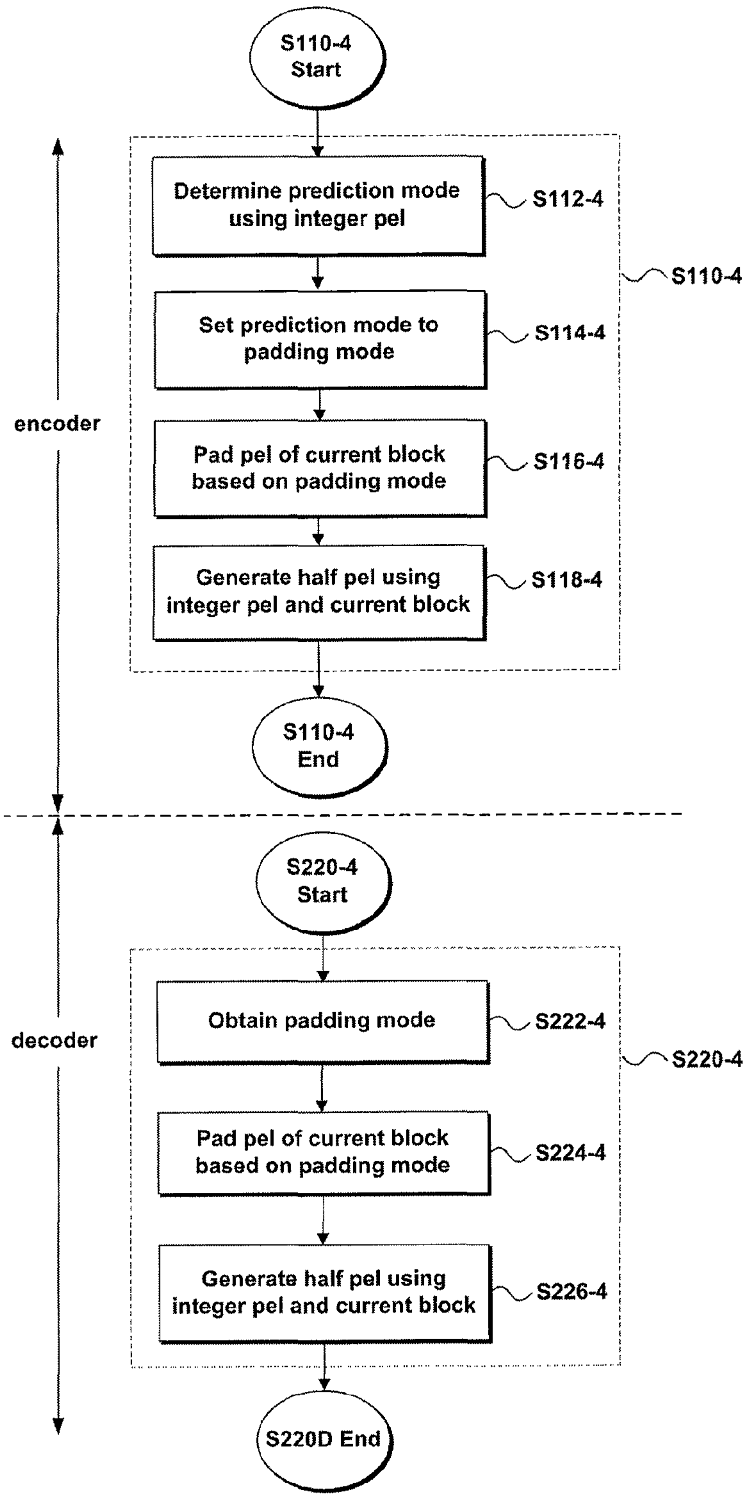
FIG. 13 is a flowchart for a half pel generating step according to a fourth embodiment of the present invention.

FIG. 13 is a flowchart for a half pel generating step according to a fourth embodiment of the present invention, and FIG.

Figure 14:
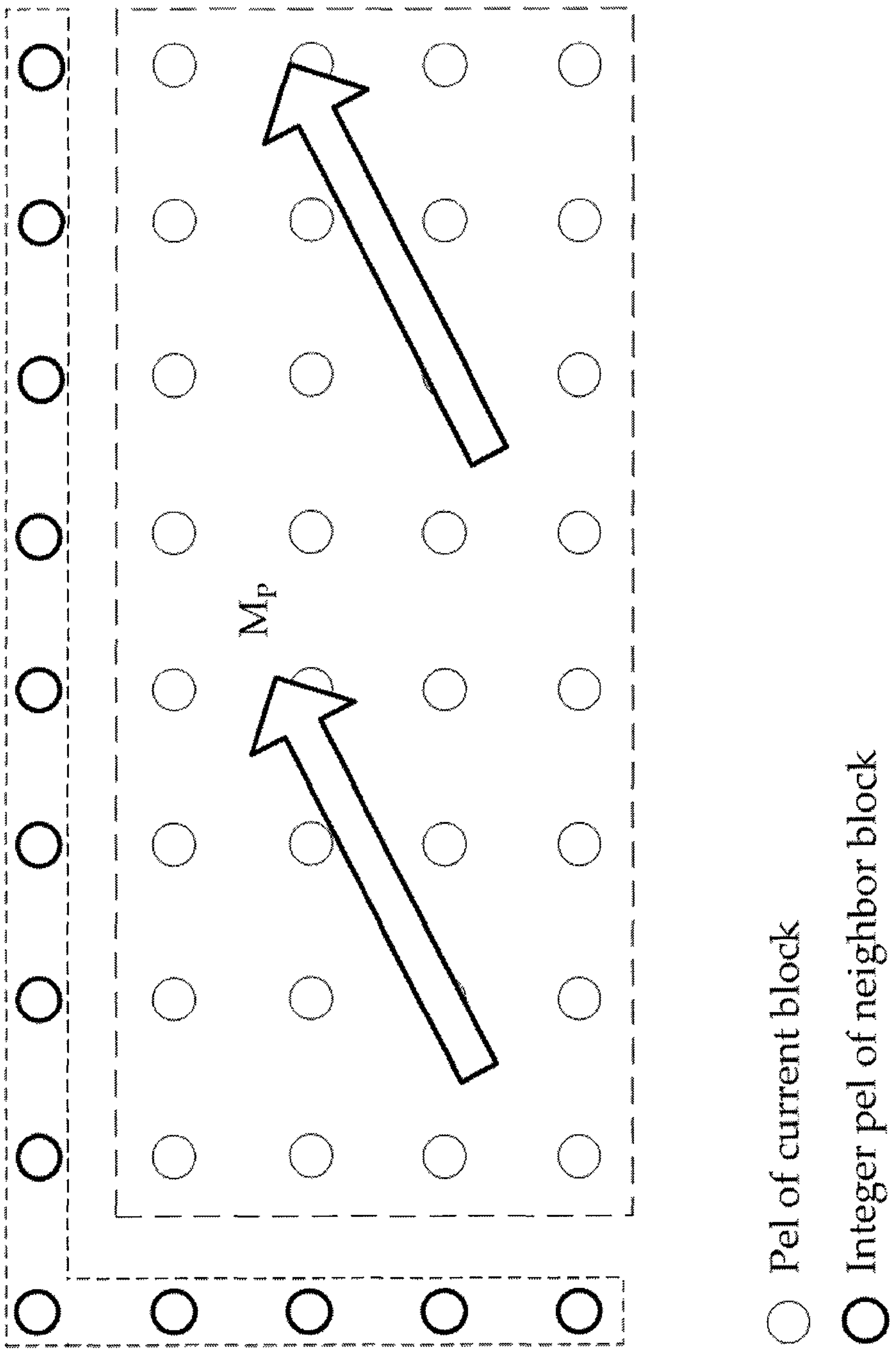
FIG. 14 and FIG. 15 are diagrams for explaining the fourth embodiment shown in FIG. 13.
Figure 15:
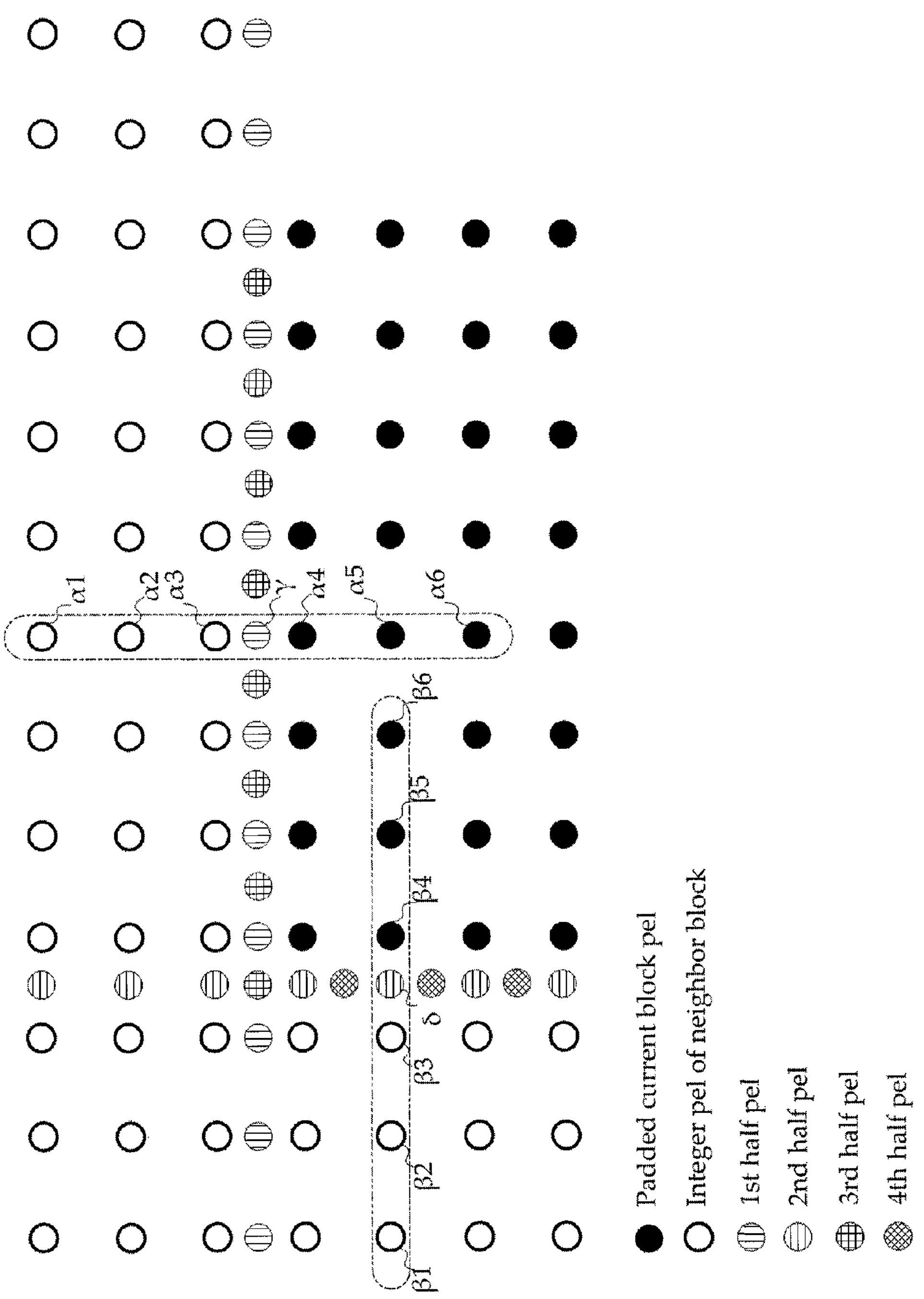

14 and FIG. 15 are diagrams for explaining the fourth embodiment shown in FIG. 13. First of all, an encoding apparatus determines a prediction mode of a current block using an integer pel of a neighbor block [S112-4]. This step may be equal to the aforesaid step S112-3. Referring to FIG. 14, it can be observed that a prediction mode $M_p$ of a current block is determined as a horizontal up direction using integer pels of a neighbor block. Subsequently, the prediction mode of the current block, which is determined in the step S112-4, is set to a padding mode (padding_mode) [S114-4]. In this case, the padding mode means a prediction direction in padding a pel of a current block using a neighbor integer pel value. The prediction of the current block is used in generating a half pel instead of reconstructing the current block finally.

Meanwhile, the padding mode (padding) can be defined as the following table. This mode may be identical to the half pel prediction mode (half_pel_prediction_mode) shown in Table 1 or may include nine modes shown in the following table in part.

TABLE 2

Value and meaning of padding mode (padding_mode)

| padding_mode | meaning |
|---|---|
| 0 | Vertical |
| 1 | Horizontal |
| 2 | DC |
| 3 | Diagonal down left |
| 4 | Diagonal down right |
| 5 | Vertical right |
| 6 | Horizontal down |
| 7 | Vertical left |
| 8 | Horizontal up |

Based on the padding mode set in the step S114-1, a pel of the current block is padded using the integer pel of the neighbor block [S116-4]. Referring to FIG. 15, it can be observed that a random value is padded into a pel of a current block to enter an available state. Since the padding mode $M_p$ is determined as a horizontal up direction in FIG. 14, the pel of the current block is padded in the horizontal up direction (Mode8) using the neighbor integer pel.

Subsequently, a half pel is generated using the integer pel of the neighbor block and the current block [S118-4]. Referring to FIG. 15, since the pel of the current block is in the available state, it is able to use the pels $\alpha_4$~$\alpha_6$ of the current block as well as the integer pels $\alpha_1$~$\alpha_3$ of the neighbor block in generating a first half pel $\gamma$. This is compared to the case that the nearest integer pel is randomly used due to unavailability of the current block in generating the first half pel $\gamma_U$ (cf. FIG. 8A) above the current block in the first embodiment. In generating a second half pel $\delta$ in FIG. 15, it is able use the pels $\beta_4$~$\beta_6$ of the current block as well.

Meanwhile, a decoding apparatus obtains the padding mode (padding_mode) from a bitstream [S222-4]. Subsequently, based on the padding mode, pels of the current block are padded using integer pels of the neighbor block [S224-4]. Half pels are then generated using the padded current block and the integer pels of the neighbor block [S226-4].

After the half pels located between the neighbor block and the current block have been generated by one of the above-explained schemes, intra-picture prediction of the current block is performed using the half pels as well as the integer pels. Therefore, it is able to predict the current block more precisely than the intra-prediction case that uses the integer pels only.

2. Downsampling in Prediction of Current Block

In the following description, a second embodiment of an intra-prediction unit is explained with reference to FIGS. 16A to 19C.

Figure 16A:
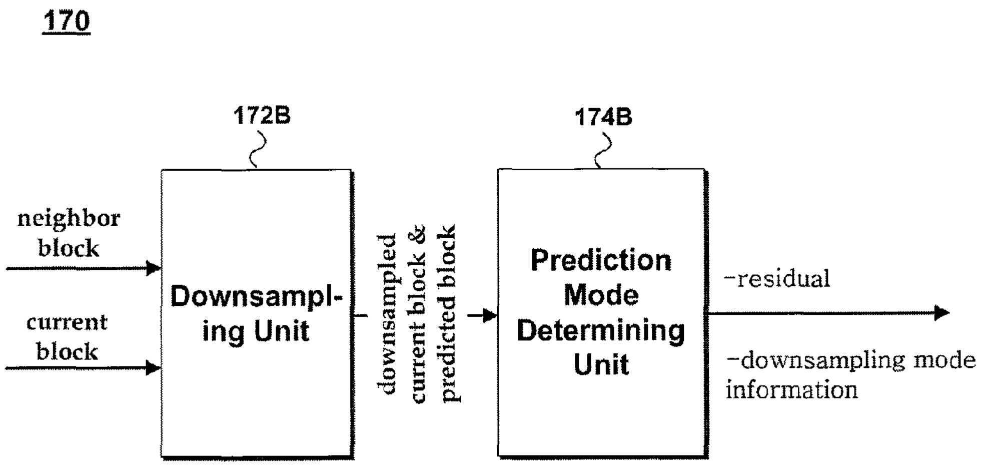
FIG. 16A is a block diagram of an intra-prediction unit of a video signal encoding apparatus according to a second embodiment of the present invention.
Figure 16B:
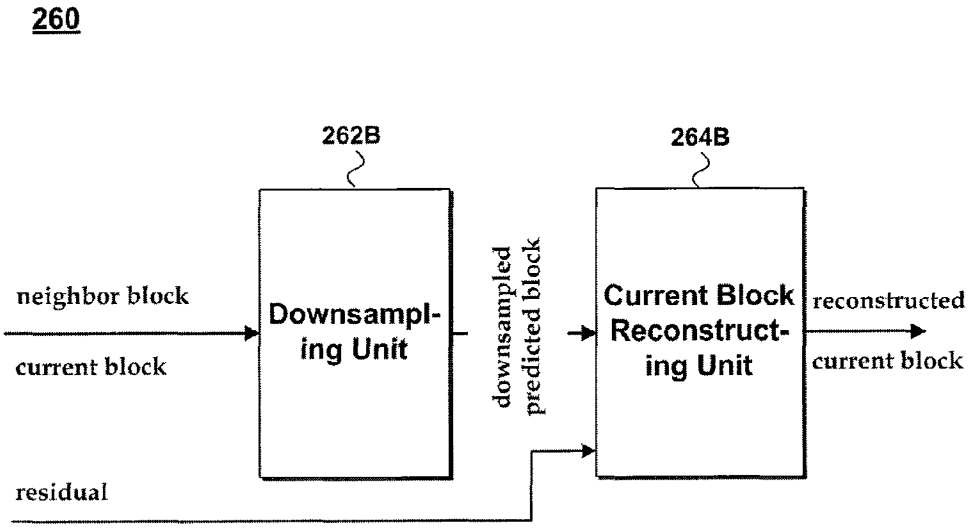
FIG. 16B is a block diagram of an intra-prediction unit of a video signal decoding apparatus according to a second embodiment of the present invention.

FIG. 16A is a block diagram of an intra-prediction unit of a video signal encoding apparatus according to a second embodiment of the present invention. FIG. 16B is a block diagram of an intra-prediction unit of a video signal decoding apparatus according to a second embodiment of the present invention. And, FIG. 17 is a flowchart of an intra-prediction process in a video signal encoding method and a video signal decoding method according to a second embodiment of the present invention.

Figure 17:
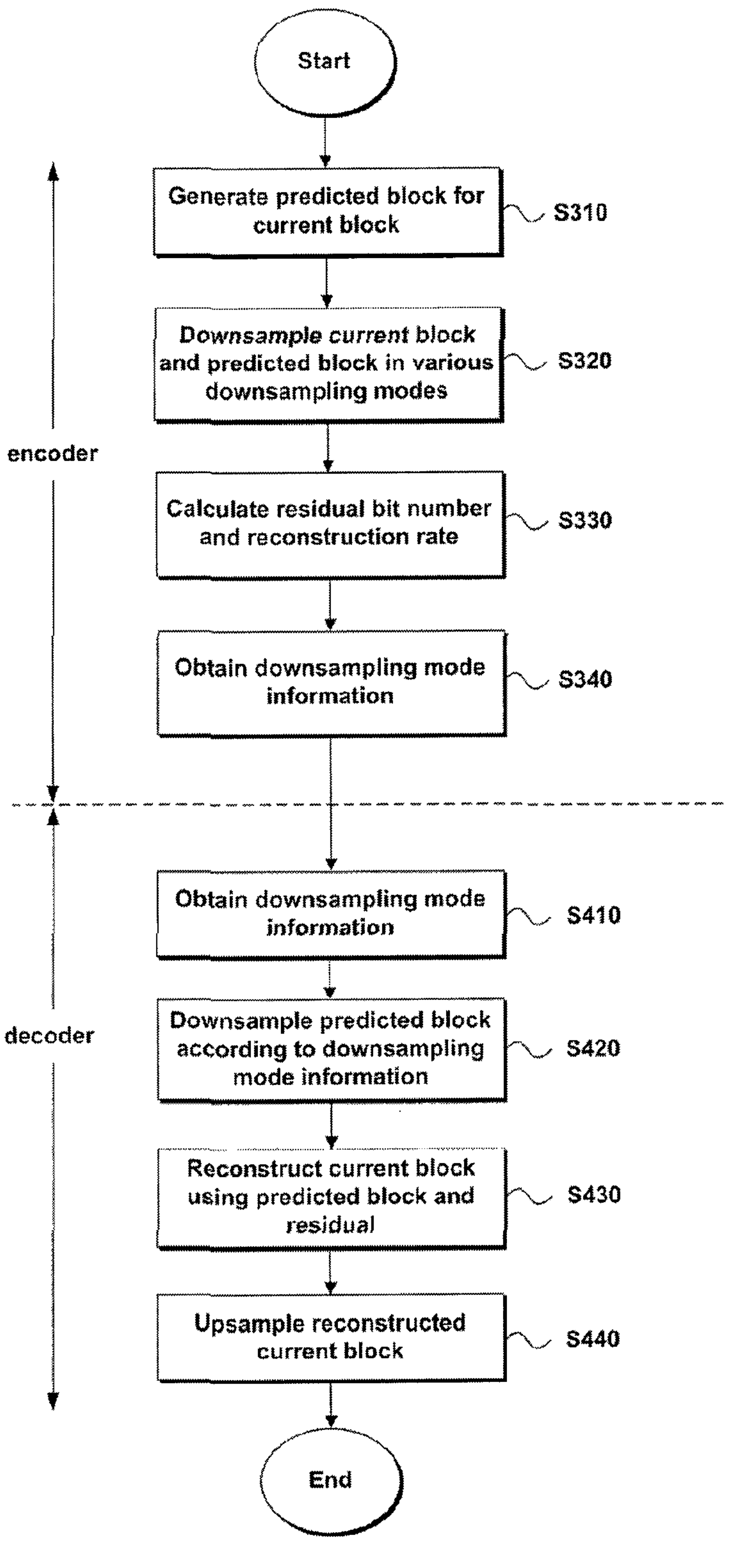
FIG. 17 is a flowchart of an intra-prediction process in a video signal encoding method and a video signal decoding method according to a second embodiment of the present invention.

Referring to FIG. 16A and FIG. 17, a downsampling unit 172B of the intra-prediction unit 170 of the encoding apparatus generates a predicted block (predictor) corresponding to a current block by performing intra-picture prediction using a neighbor block and the current block [S310]. In this case, as mentioned in the foregoing description of the intra-prediction unit 170 according to the first embodiment, the intra-prediction can be performed using half pels as well as integer pels. Subsequently, the downsampling unit 172B performs downsampling on the current block and the predicted block generated in the step S310 in various downsampling modes [S320]. In this case, the downsampling means that a block having a size smaller than that of the current block in a horizontal direction and/or a vertical direction is generated. For instance, in case that a current block is a 16×16 block, a 16×8 block, an 8×16 block, an 8×8 block and the like are generated. And, the downsampling mode (downsampling_mode) is the information indicating how much downsampling is performed in which direction and includes downsampling direction information and downsampling multiple information.

Figure 18:
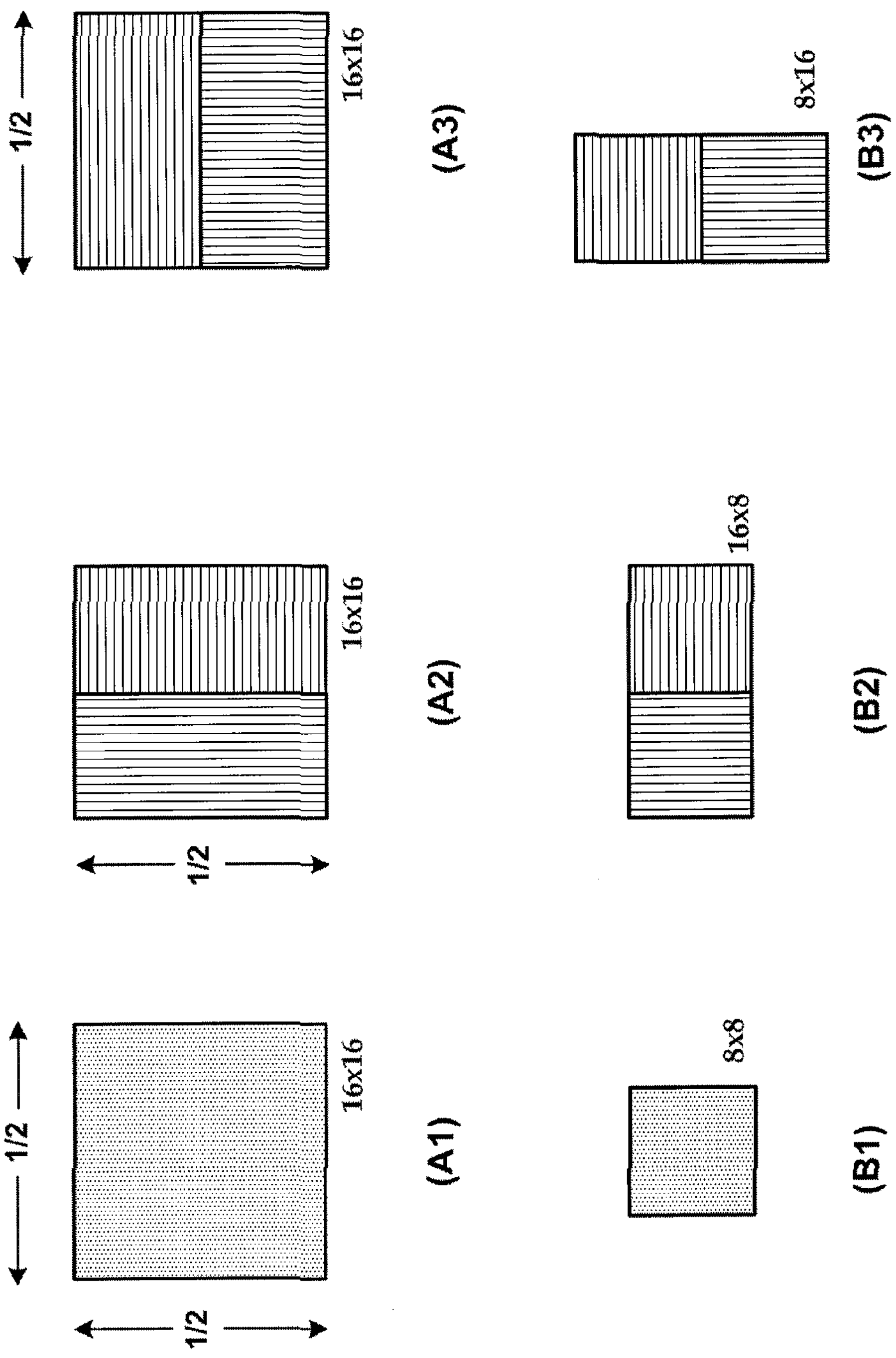
FIG. 18 is a diagram for explaining various block patterns and the concept of downsampling.

FIG. 18 is a diagram for explaining various block patterns and the concept of downsampling. First of all, referring to (A1), (A2) and (A3) of FIG. 18, all the corresponding blocks correspond to 16×16 blocks. In (A1) of FIG. 18, shown is a pattern that pel values of the block are uniform or monotonous. The block shown in (A2) of FIG. 18 have a monotonous pattern within a left area and a monotonous pattern within a right area. And, it can be observed that this block has symmetry in a vertical direction. In case of the block shown in (A3) of FIG. 8, a monotonous pattern is shown in an upper area and a monotonous pattern is shown in a lower area. This block has symmetry in a horizontal direction. In case that the block shown in (A1) of FIG. 18 has the symmetry in vertical and horizontal directions, characteristics of a current block are not considerably damaged even if downsampling is performed in both of the vertical direction and the horizontal direction. Hence, it is able to generate such an 8×8 block as the block shown in (B1) of FIG. 18 by performing the downsampling by ½ in each of the vertical and horizontal directions. In case of the block shown in (A2) of FIG. 18, it is able to generate such a 16×8 block as the block shown in (B2) of FIG. 18 by performing the downsampling by ½ in the vertical direction only. In case of the block shown in (A3) of FIG. 8, even if such an 8×16 block as the block shown in (B3) of FIG. 18 is generated by performing the downsampling by ½ in the horizontal direction, it is able to ignore the corresponding loss.

Meanwhile, the downsampling modes explained in the step S320 can be defined as the following table, by which examples of the present invention are non-limited.

TABLE 3

| Value and Meaning of Downsampling Mode (downsampling_mode) | |
|---|---|
| downsampling_mode | meaning |
| 0 | No downsampling |
| 1 | Vertical direction ½ and horizontal direction ½ |
| 2 | Vertical direction ½ |
| 3 | Horizontal direction ½ |

Figure 19A:
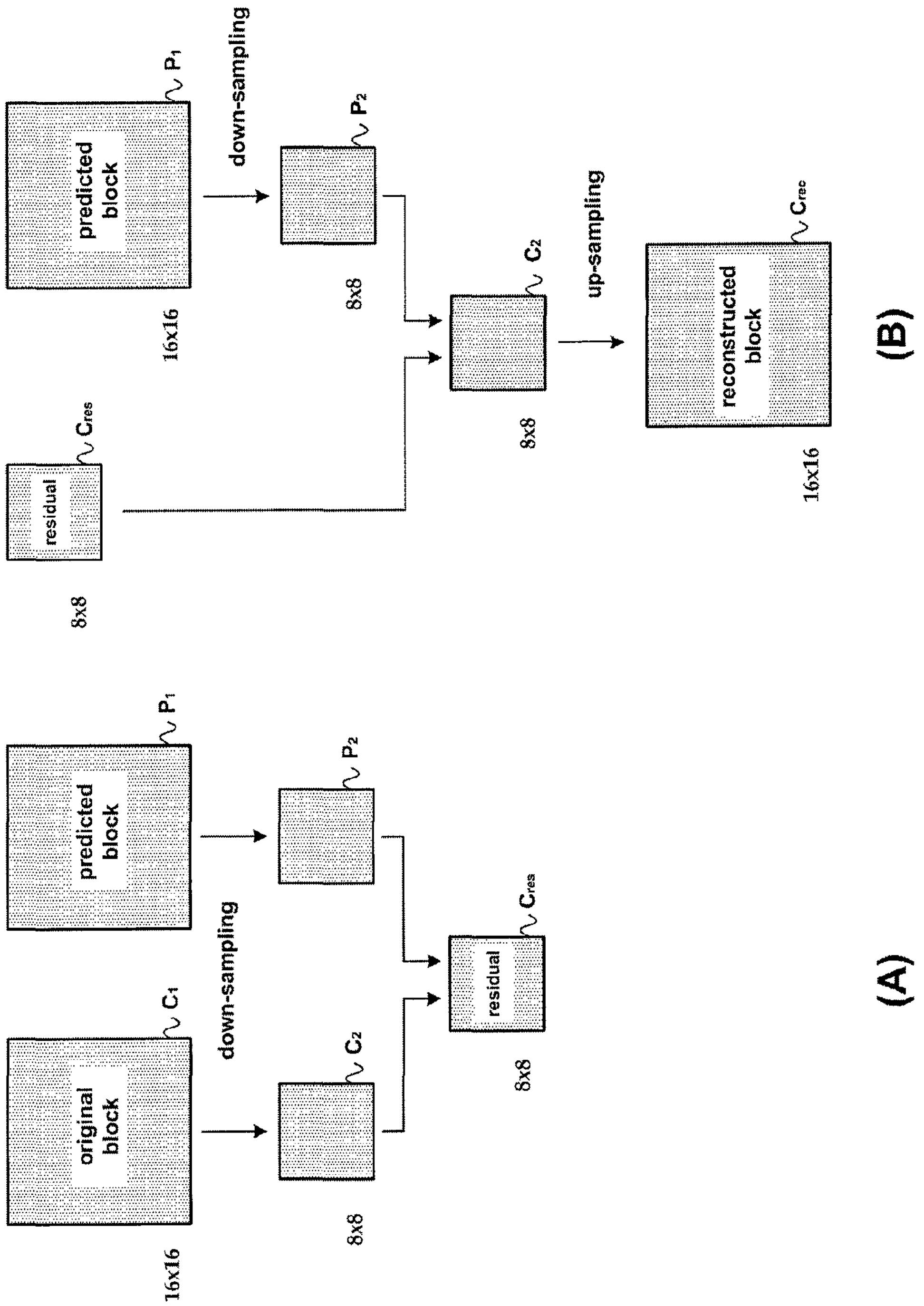
FIGS. 19A to 19C are diagrams for explaining steps in encoding and decoding apparatuses.
Figure 19B:
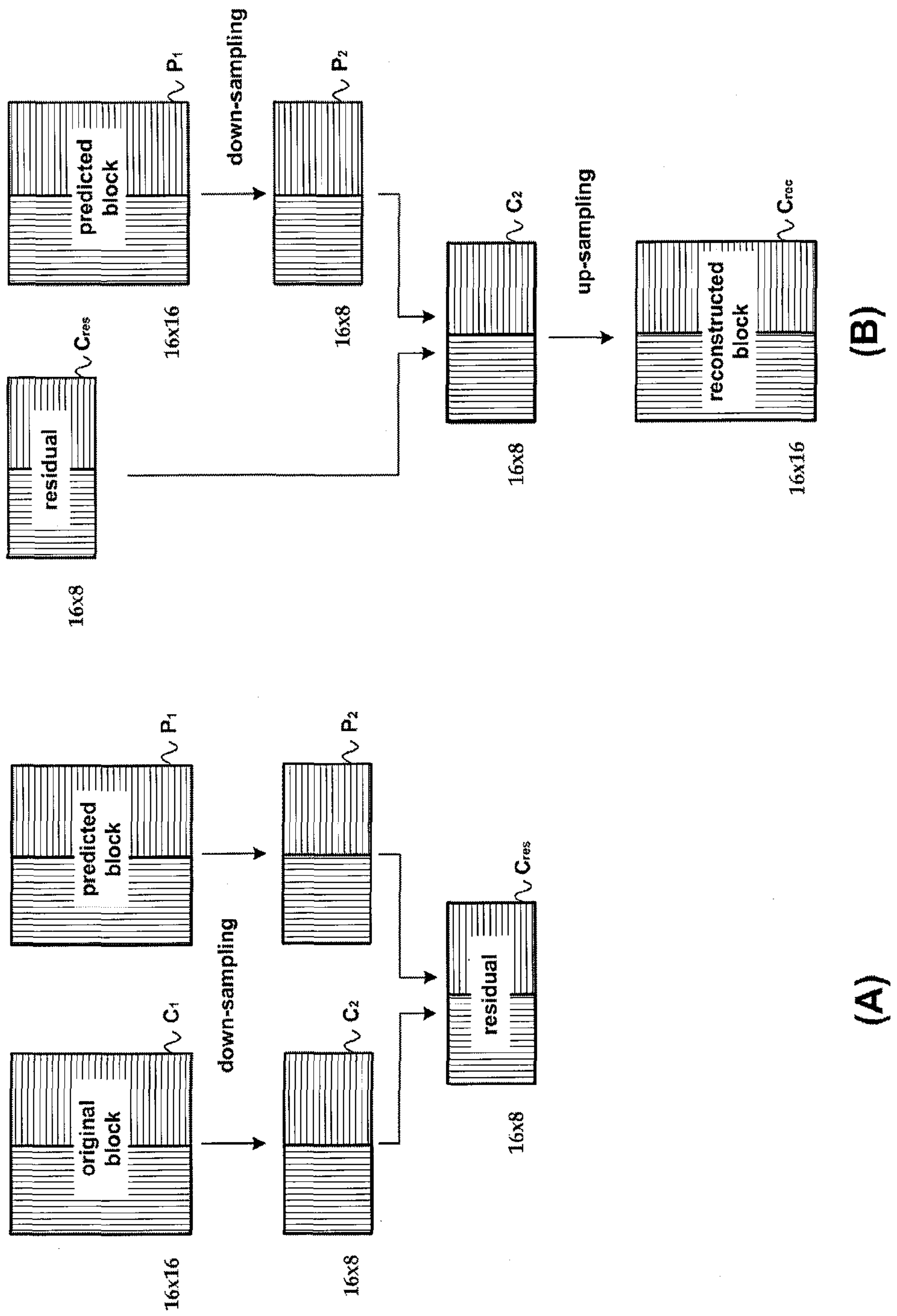
Figure 19C:
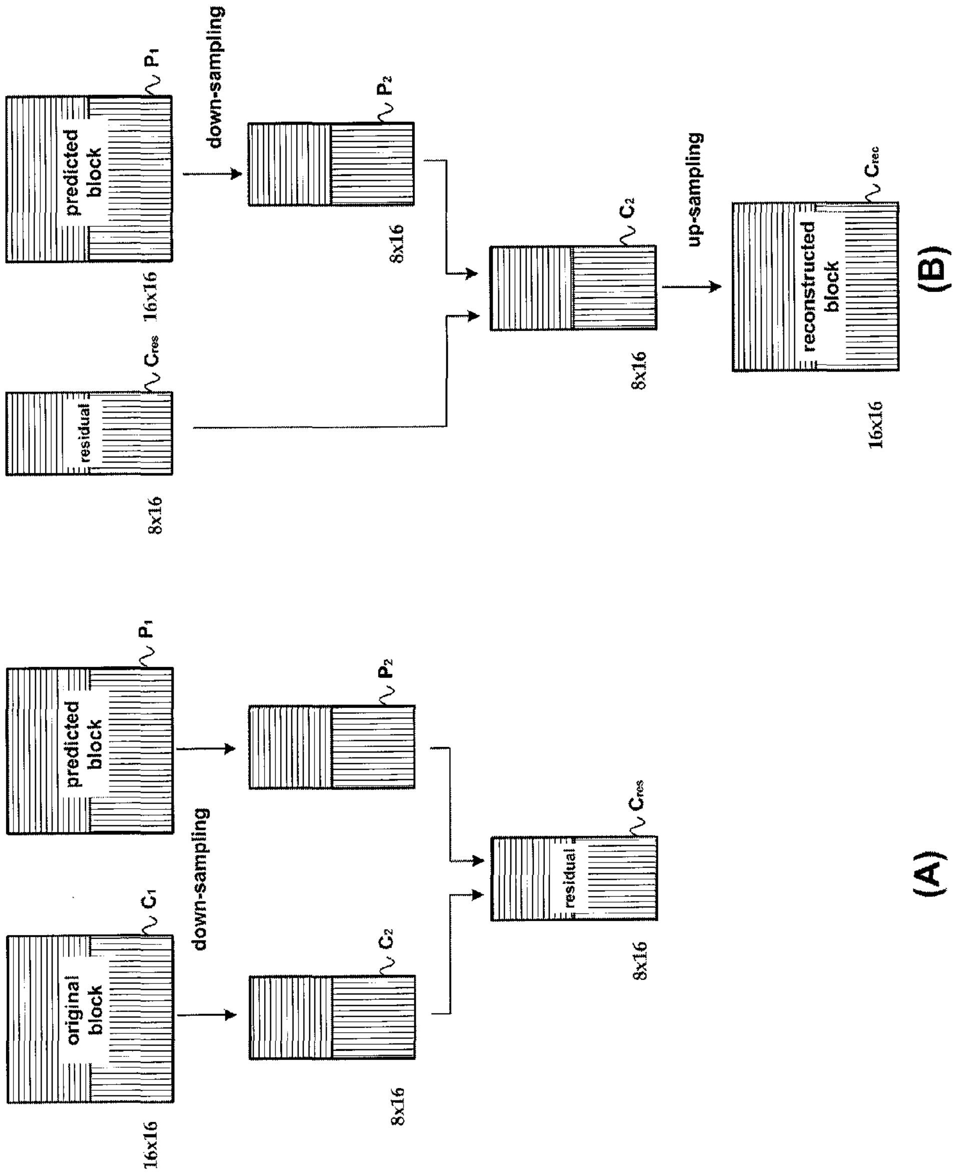

FIGS. 19A to 19C are diagrams for explaining steps in encoding and decoding apparatuses. Referring to (A) of FIG. 19A, it can be observed that an 8×8 downsampled current block $C_2$ and a prediction block $P_2$ are generated by downsampling a 16×16 current block (original block) $C_1$ and a predicted block $P_1$ in mode 1 (i.e., vertical direction ½ and horizontal direction ½), respectively. Using this result, a residual $C_{res}$ having the same size of the downsampled size (i.e., 8×8). In (A) of FIG. 19B, shown is the case of mode 2 (vertical direction ½). In (A) of FIG. 19C, shown is the case of mode 3 (horizontal direction ½).

Referring to FIG. 16A and FIG. 17, a prediction mode determining unit 174B can calculate the bit number and a reconstruction rate required for coding with regard to the residual generated to correspond to each of the mode 0 (non-downsampling) to the mode 4 in the step S320 [S330]. Subsequently, the downsampling mode information of the current block is determined based on the bit number and the reconstruction rate, the determined downsampling mode information is included in a bitstream, and the residual corresponding to the determined downsampling mode is transferred [S340].

Referring to FIG. 16B and FIG. 17, a downsampling unit 262B of the intra-prediction unit 260 of the decoding apparatus obtains downsampling mode information (downsampling_mode) [S410]. The downsampling unit 262B then predicts a current block according to a prediction mode. In this case, like the case of the first embodiment, it is able to perform prediction using half pels as well as integer pels. According to the downsampling mode, a prediction block is downsampled [S420]. For instance, in case that the downsampling mode is 1 (downsampling_mode=1), referring to (B) of FIG. 19A, if a predicted block $P_1$ is 16×16, an 8×8 downsampled predicted block $P_2$ is generated. If the downsampling mode is mode 2, referring to (B) of FIG. 19B, a predicted block is downsampled into 16×8. If the downsampling mode is mode 3, referring to (B) of FIG. 19C, an 8×16 predicted bock is generated.

Subsequently, a current block reconstructing unit 264B reconstructs the current block using the predicted block downsampled in the step S420 and the received residual [S430]. In this case, the current block can be generated in a manner of adding the residual value to each pixel value of the predicted block. Referring to (B) of FIG. 19A, (B) of 19B and (B) of FIG. 19C, a size of the reconstructed current block $C_2$ is almost equal to that of the transferred residual and the downsampled predicted block. Subsequently, the current block reconstructing unit 264B upsamples the reconstructed current block [S440]. In this case, the upsampling is performed in a manner inverse to that of the downsampling. In particular, in case that the downsampling is performed by 1/n time in an x-direction, the upsampling can be performed by n times in the x-direction. For instance, in case that a downsampling mode corresponds to ½ in a horizontal direction, the upsampling in the step S430 can be performed by n times in the x-direction. Referring to (B) of FIG. 19A, (B) of 19B and (B) of FIG. 19C, it can be observed that a current block Cres is generated that is upsampled into the same size (16×16) of the predicted block, i.e., into the original size.

Thus, by transferring a residual for a downsampled block in some cases instead of transferring a residual for a block having an original size, specifically, in case of a block that is uniform overall or has a monotonous pattern in a specific direction, it is able to considerably reduce the bits required for the residual coding by minimizing the loss. And, it is also able to reduce complexity in a residual encoding or decoding process.

3. Block Type Including Heterogeneous Type Sub-Block

In the following description, a third embodiment of an intra-prediction unit is explained with reference to FIGS. 20A to 24.

Figure 20A:
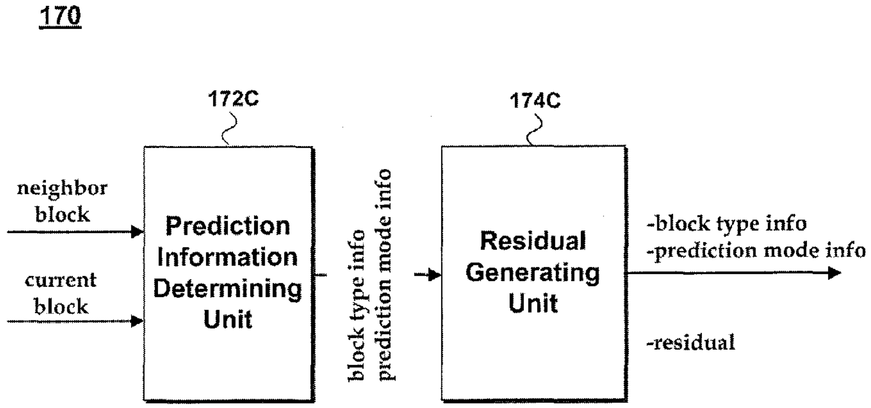
FIG. 20A is a block diagram of an intra-prediction unit of a video signal encoding apparatus according to a third embodiment of the present invention.
Figure 20B:
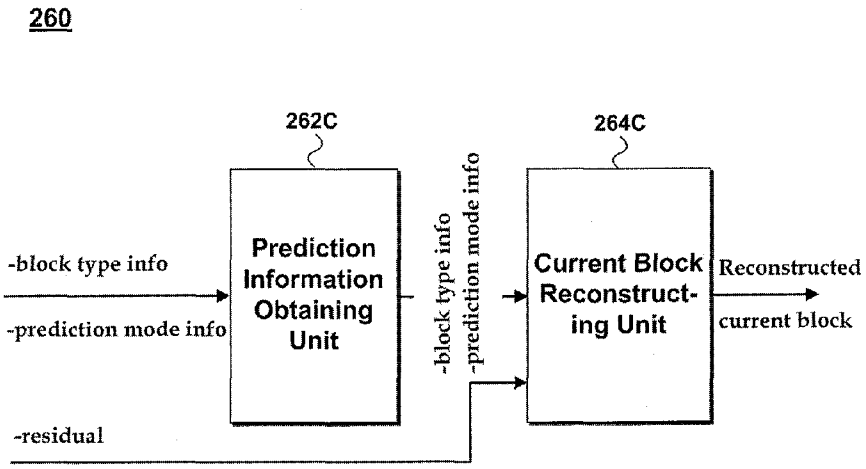
FIG. 20B is a block diagram of an intra-prediction unit of a video signal decoding apparatus according to a third embodiment of the present invention.
Figure 21:
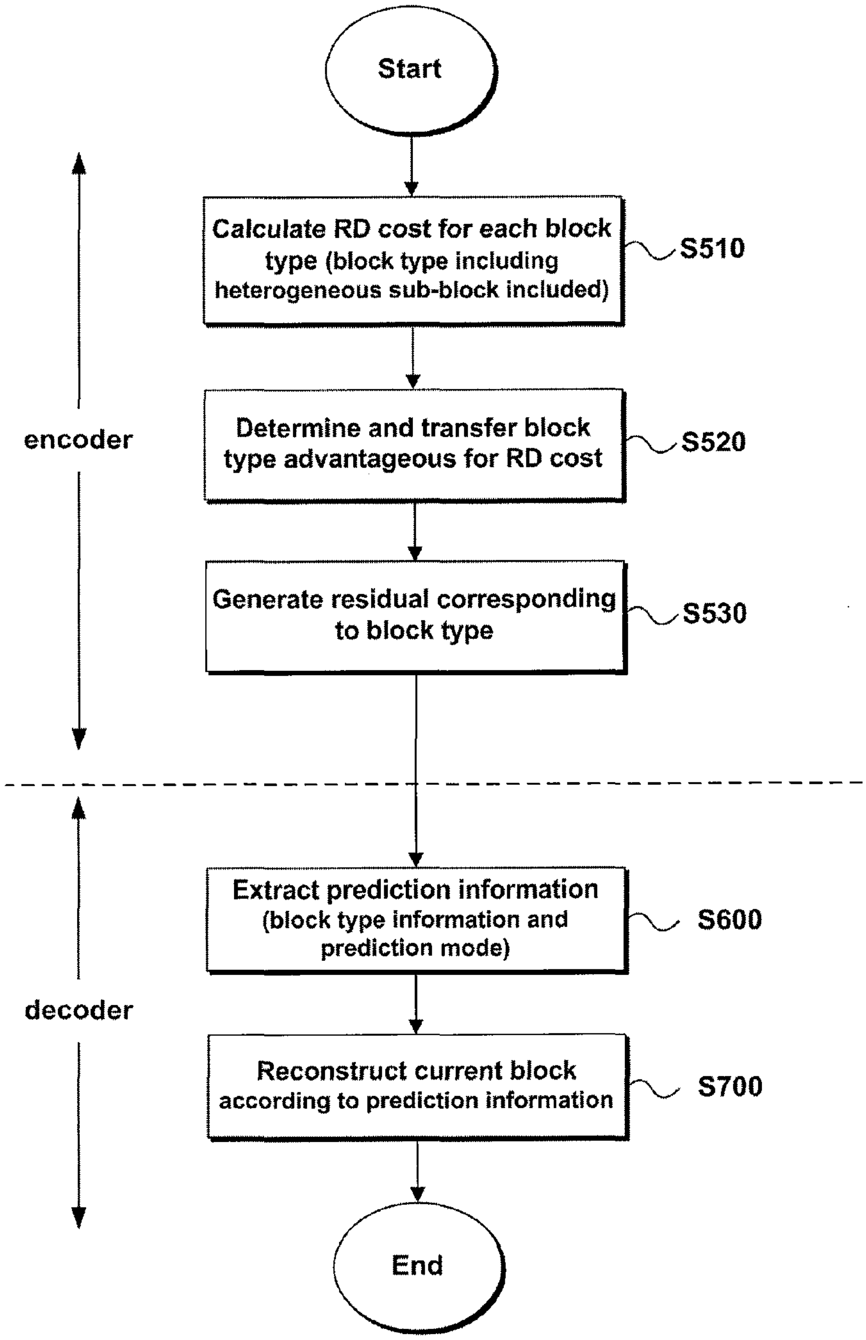
FIG. 21 is a flowchart of an intra-prediction process in a video signal encoding method and a video signal decoding method according to a third embodiment of the present invention.

FIG. 20A is a block diagram of an intra-prediction unit of a video signal encoding apparatus according to a third embodiment of the present invention, and FIG. 20B is a block diagram of an intra-prediction unit of a video signal decoding apparatus according to a third embodiment of the present invention. FIG. 21 is a flowchart of an intra-prediction process in a video signal encoding method and a video signal decoding method according to a third embodiment of the present invention.

Referring to FIG. 20A and FIG. 21, a prediction information determining unit 172C of the intra-prediction unit 170 of the encoding apparatus determines prediction information for performing inter-picture prediction on a current block using a neighbor block and the current block. The prediction information can include block type information and prediction mode information. In this case, a block type is the information indicating whether a block having a specific size (e.g., 16×16) is divided into sub-blocks, what size (e.g., 8×8, 4×4) the sub-block has if the block is divided into the sub-blocks, and the like. Moreover, the block type may be the information indicating whether a current block is for intra-prediction or inter-prediction.

Figure 22:
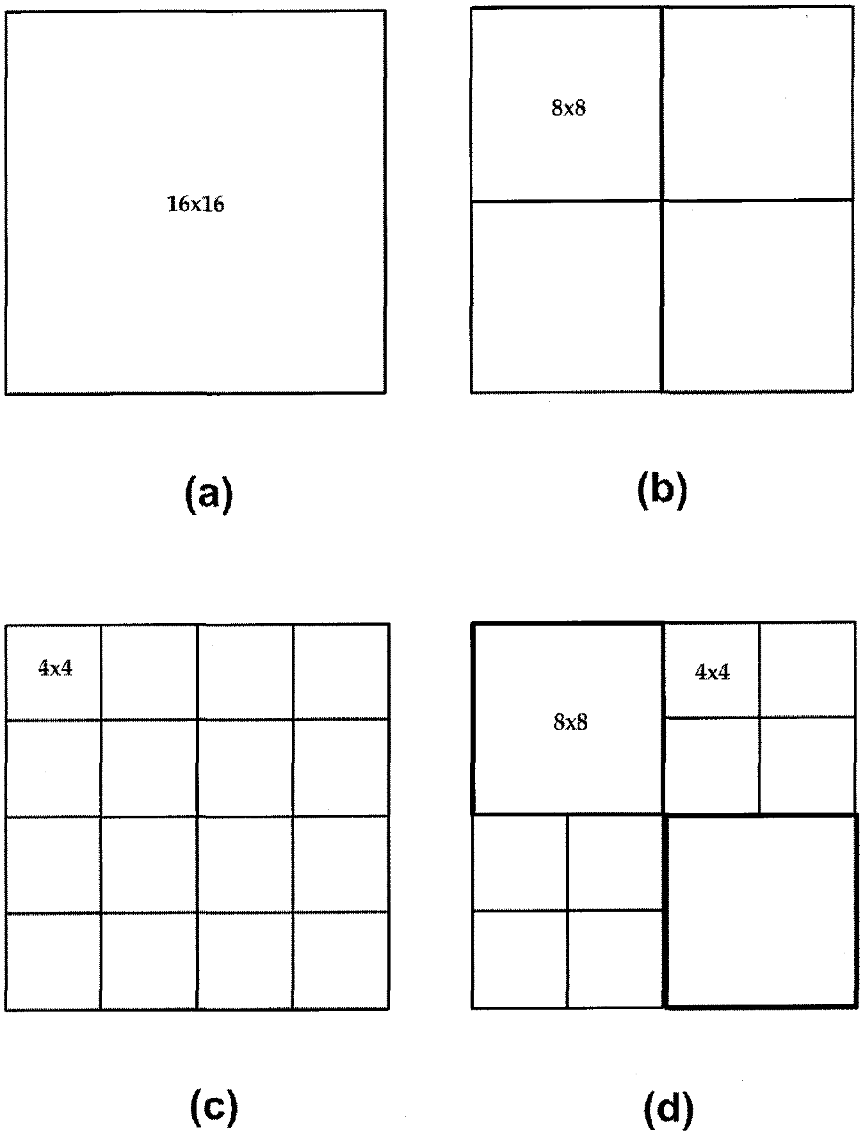
FIG. 22 is a diagram for explaining various block types.

FIG. 22 is a diagram for explaining various block types. Referring (a) of FIG. 22, a 16×16 block can include a single 16×16 block. Referring (b) of FIG. 22, a 16×16 block can include four 8×8 blocks. Referring (c) of FIG. 22, a 16×16 block can include sixteen 4×4 blocks. If the block, as shown in (a) to (c) of FIG. 22, is divided into the sub-blocks of the same size (e.g., 8×8, 4×4) only, coding efficiency may be lowered. In case that a prescribed block is divided into small-sized sub-blocks (e.g., 4×4) only, it is exceedingly subdivided despite a small variation of a local picture pixel value (e.g., left upper or right lower area within block), Hence, the coding efficiency can be lowered. This is because prediction mode and transform coefficient are coded for each sub-block. On the contrary, in case that a prescribed block is divided into relatively large-sized sub-blocks (8×8) only, it is divided into considerably oversized blocks despite that a significant variation of a local pixel value. Hence, the coding efficiency can be lowered. This is because a residual value may increase due to an inappropriate prediction value in case of prediction with oversized blocks. Therefore, it is able to define a block including sub-blocks differing in heterogeneous size, which is shown in (d) of FIG. 22. For instance, it is able to define a block type including both an 8×8 block and 4×4 blocks within a single 16×16 block.

Referring now to FIG. 20A and FIG. 21, according to the above-explained various block types, the prediction information determining unit 172 calculates a coding efficiency (RD cost) corresponding to each case [S510]. Subsequently, the prediction information determining unit 172C determines block type information and prediction mode information advantageous for coding efficiency based on the coding efficiency calculated in the step S510 and then transfers the determined information by having the determined information included in a bitstream [S520]. Moreover, a residual generating unit 174C predicts a current block according to the block type and prediction mode determined in the step S520 and then generates a corresponding residual (i.e., a difference between a current block and a predicted block) [S530].

Meanwhile, referring to FIG. 20B and FIG. 21, a prediction information obtaining unit 262C of the intra-prediction unit of the decoding apparatus obtains prediction information (i.e., block type information and prediction information) of the current block from the bitstream [S600]. For instance, if the current block includes a 16×16 block, it is able to obtain a single prediction mode information corresponding to the single 16×16 block. If the current block includes four 8×8 blocks, it is able to obtain four prediction mode informations. Besides, in case that the current block includes a heterogeneous-size block, it will be explained in detail with reference to FIG. 23, FIG. 4A and FIG. 2B later. Subsequently, a current block reconstructing unit 264C reconstructs the current block based on the obtained prediction information [S700].

Figure 23:
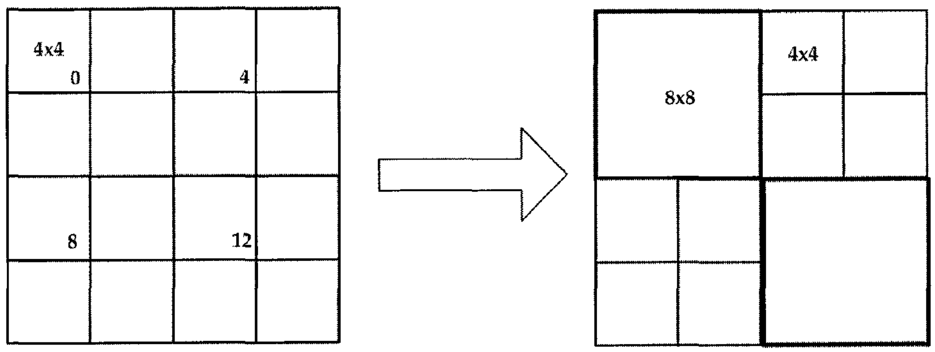
FIG. 23 is a diagram for explaining a process for setting a block type in case of including sub-blocks in different types.
Figure 23:
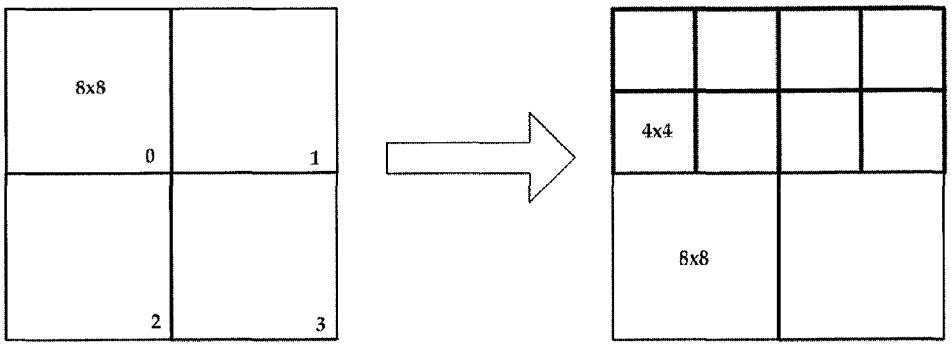
Figure 24A:
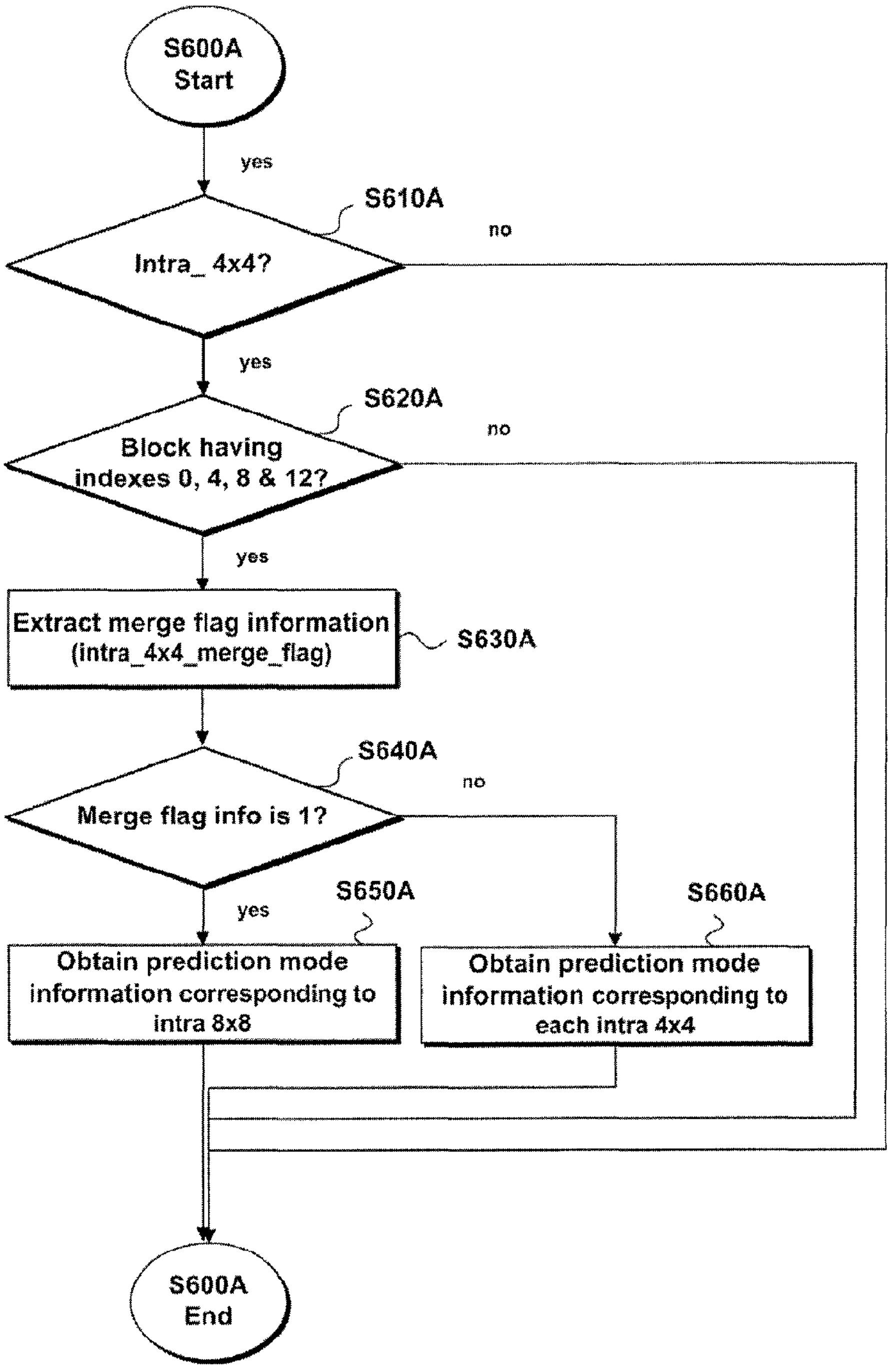
FIG. 24A and FIG. 24B are flowcharts for sub-steps of a predicted information obtaining step S600 in FIG. 21 according to embodiments of the present invention, respectively.
Figure 24B:
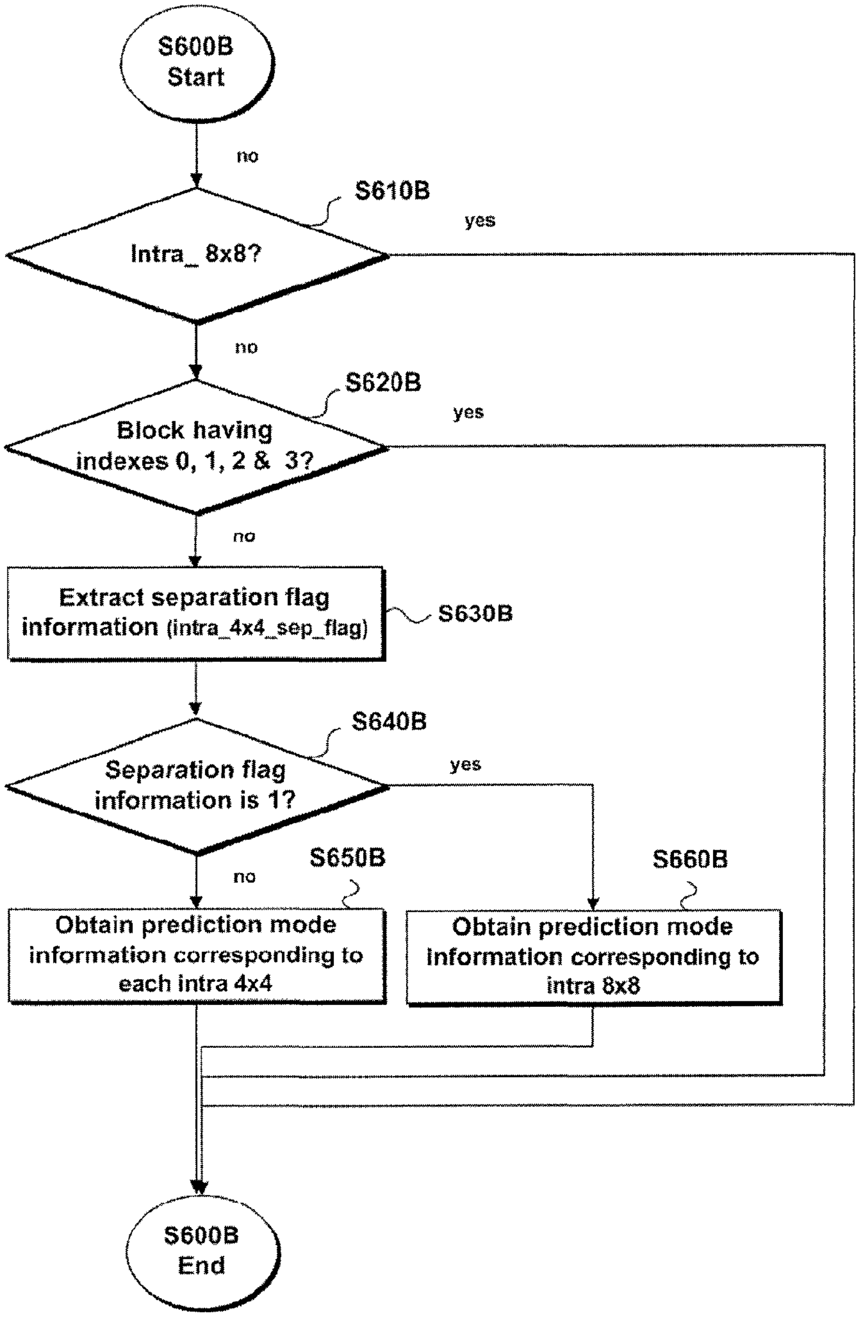

FIG. 23 is a diagram for explaining a process for setting a block type in case of including sub-blocks in different types, and FIG. 24A and FIG. 24B are flowcharts for sub-steps of a predicted information obtaining step S600 in FIG. 21 according to embodiments of the present invention, respectively.

Referring to FIG. 23, in case that sub-blocks in heterogeneous types are included, it is able to set a block type by one of two schemes. First of all, referring to (A) of FIG. 23, based on the case that first sub-blocks (e.g., 4×4 blocks) are included, the first sub-blocks (e.g., 4×4 blocks) are merged together to represent a second sub-block (e.g., an 8×8 block). In this case, if a size of the first sub-block is U×V, a size of the second sub-block may correspond to U×(V·n), (U·n)×(V), or (U·n)×(V·n), where n is an integer. The method of representing the second sub-block based on the first sub-block will be explained with reference to FIG. 24A.

On the contrary, referring to (B) of FIG. 23, based on a second sub-block (e.g., 8×8 block), the second sub-block can be represented as first sub-blocks (e.g., 4×4 blocks) by separating some of the second sub-blocks. This will be explained with reference to FIG. 24B.

Meanwhile, in (A) of FIG. 23, a bitstream can be constructed as the following syntax. With reference to the following syntax and FIG. 24A, a case of allowing 8×8 block in 4×4 block mode will be explained in the following description.

[Syntax 1] Syntax in case of allowing 8 × 8 block in 4 × 4 block mode

```
mb_pred( mb_type ) {
  if( MbPartPredMode( mb_type, 0) == Intra_4x4 | |
    MbPartPredMode( mb_type, 0) == Intra_8x8 | |
    MbPartPredMode( mb_type, 0) == Intra_16x16 ) {
    if( MbPartPredMode( mb_type, 0) == Intra_4x4 )                          (C1)
      for( luma4x4BlkIdx=0; luma4x4BlkIdx<16;
      luma4x4BlkIdx++ ) {
    if((luma4x4BlkIdx%4)==0 )                                               (C2)
      intra4x4_merge_flag                                                   (C3)
    if(intra4x4_merge_flag == 1 && luma4x4BlkIdx%4==0) {                    (C4)
      prev_intra8x8_pred_mode_flag [ luma4x4BlkIdx/4 ]                      (C5)
      if( ! prev_intra8x8_pred_mode_flag [ luma4x4BlkIdx/4 ])               (C5)
      rem_intra8x8_pred_mode[ luma4x4BlkIdx/4 ]                             (C5)
    } else if( intra4x4_merge_flag == 0) {                                  (C6)
        prev_intra4x4_pred_mode_flag[                                       (C7)
        luma4x4BlkIdx ]
```

-continued

[Syntax 1] Syntax in case of allowing 8 × 8 block in 4 × 4 block mode

```
        if( !prev_intra4x4_pred_mode_flag[                                  (C7)
        luma4x4BlkIdx ] )
          rem_intra4x4_pred_mode[ luma4x4BlkIdx ]                           (C7)
    }                                                                       (C7)
    }
  if( MbPartPredMode( mb_type, 0) == Intra_8x8 )
    for( luma8x8BlkIdx=0; luma8x8BlkIdx<4;
    luma8x8BlkIdx++ ) {
        prev_intra8x8_pred_mode_flag[ luma8x8BlkIdx ]
        if( !prev_intra8x8_pred_mode_flag[
        luma8x8BlkIdx ] )
          rem_intra8x8_pred_mode[ luma8x8BlkIdx ]
    }
```

Referring to FIG. 24A and Syntax 1, it is preferentially determined whether a block type of a current block is 'intra_4×4' [S610A] [C1 in Syntax 1]. If the block type is 'intra_4×4' ('yes' in the step S610A), indexes of sixteen 4×4 blocks are set to 0 to 15, respectively. In this case, it is determined whether an index 'i' is a predetermined constant. If a size of a second sub-block is (U·n)×(V·n), it is determined whether the index 'i' satisfies the following formula.

$$i \bmod n^2 = c \qquad \text{[Formula 6]}$$

In this case, 'i' indicates a sub-block index, 'n' indicates a size difference between a first sub-block and a second sub-block, and 'c' is a predetermined constant.

For instance, it is determined whether indexes of blocks are 0, 4, 8 and 12 [S620A] [C2 in Syntax 1]. This is to check whether it is a first block if sixteen 4×4 blocks are tied by unit of four in (A) of FIG. 23. If indexes of 4×4 blocks are 0, 4, 8 and 12 ('yes' in the step S620A), a merge flag information (intra_4×4_merge_flag) is extracted [S630A]. It is unnecessary to extract the merge flag each 4×4 block. And, the merge flag can be extracted for a single 4×4 block by the unit of 4. Hence, the merge flag can be extracted only if the indexes of the 4×4 blocks are 1, 5, 9 and 13. And, it is understood that the merge flag can be extracted only if the indexes of the 4×4 blocks are 2, 6, 10 and 14.

Meanwhile, the merge flag information can be defined as follows.

TABLE 4

Merge Flag Information

| Merge flag information (intra_4 × 4_merge_flag) | Meaning |
|---|---|
| 0 | Constructed with 4 × 4 blocks |
| 1 | Constructed with 8 × 8 blocks instead of 4 × 4 blocks |

If the merge flag information is 1 ('yes' in the step S640A) (C4 in syntax), a single prediction mode information corresponding to 8×8 block is obtained [S650A] (C5 in syntax). On the contrary, if the merge flag information is 0 ('no' in the step S640A) (C6 in syntax), four prediction mode informations corresponding to 4×4 blocks are obtained [S660A] (C7 in syntax). In this case, the prediction mode information can be extracted from the transferred information or derived from mode information of neighbor block.

Meanwhile, in (B) of FIG. 23, a bitstream can be constructed as Syntax 2. With reference to the following syntax and FIG. 24B, a case of allowing 4×4 blocks in 8×8 block mode will be explained in the following description.

[Syntax 2] Syntax in case of allowing 4 × 4 blocks in 8 × 8 block mode

```
mb_pred( mb_type ) {
  if( MbPartPredMode( mb_type, 0) == Intra_4x4 | |
    MbPartPredMode( mb_type, 0) == Intra_8x8 | |
    MbPartPredMode( mb_type, 0) == Intra_16x16 ) {
    if( MbPartPredMode( mb_type, 0) == Intra_4x4 )
      for( luma4x4BlkIdx=0; luma4x4BlkIdx<16; luma4x4BlkIdx++ ) {
        prev_intra4x4_pred_mode_flag[ luma4x4BlkIdx ]
        if( !prev_intra4x4_pred_mode_flag[ luma4x4BlkIdx ] )
          rem_intra4x4_pred_mode[ luma4x4BlkIdx ]
      }
    if( MbPartPredMode( mb_type, 0 ) == Intra_8x8 )                          (C1)
      for( luma8x8BlkIdx=0; luma8x8BlkIdx<4; luma8x8BlkIdx++ ) {             (C2)
    intra8x8_sep_flag                                                        (C3)
    if(intra8x8_sep_flag == 1) {                                             (C4)
     for(luma4x4BlkIdx=0; luma4x4BlkIdx<4; luma4x4BlkIdx++) {                (C5)
          prev_intra4x4_pred_mode_flag[ luma8x8BlkIdx *4 + luma4x4BlkIdx ]   (C5)
            if(    !prev_intra4x4_pred_mode_flag[ luma8x8BlkIdx    *    4 +  (C5)
luma4x4BlkIdx ] )
            rem_intra4x4_pred_mode[ luma8x8BlkIdx *4 + luma4x4BlkIdx ]       (C5)
     }                                                                       (C5)
    } else {                                                                 (C6)
        prev_intra8x8_pred_mode_flag[ luma8x8BlkIdx ]                        (C7)
        if( !prev_intra8x8_pred_mode_flag[ luma8x8BlkIdx ] )                 (C7)
          rem_intra8x8_pred_mode[ luma8x8BlkIdx ]                            (C7)
    }                                                                        (C7)
      }
```

Referring to FIG. 24B and Syntax 2, it is determined whether a block type of a current block is 'intra_8×8' [S610B] [C1 in Syntax 2]. If the block type is 'intra_8×8' ('yes' in the step S610B), indexes of four 8×8 blocks are set to 0 to 3, respectively. In this case, it is determined whether indexes of the blocks are 0, 1, 2 and 3 [S620B] [C2 in syntax 2]. If the indexes of the 8×8 blocks are 0, 1, 2 and 3 ('yes' in the step S620B) (i.e., for all the 8×8 blocks), separation flag information (intra_8×8_sep_flag) is extracted [S630B] [C3 in Syntax 2].

Meanwhile, the separation flag information can be defined as follows.

TABLE 5

Separation Flag Information

| Separation flag information (intra_8 × 8_sep_flag) | Meaning |
|---|---|
| 0 | Constructed with 8 × 8 block |
| 1 | Constructed with four 4 × 4 blocks instead of single 8 × 8 block |

If the separation flag information is 1 ('yes' in the step S640B) (C4 in syntax), four prediction modes corresponding to 4×4 blocks are obtained [S650B] [C5 in syntax]. On the other hand, if the separation flag information is 0 ('no' in the step S640B) (C6 in syntax), a single prediction mode corresponding to 8×8 block is obtained [S660B] [C7 in syntax].

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to encoding and decoding of a video signal.

The invention claimed is:

1. A method of processing a video signal, comprising:

obtaining residual information of a current block from the video signal, the current block being coded in an intra prediction mode, the intra prediction mode corresponding to predicting a current sample of the current block within a current picture comprising the current block;

obtaining an intra prediction reference sample from interpolation of at least one boundary sample of a neighbor block and at least one boundary sample of the current block, the neighbor block being adjacent to the at least one boundary sample of the current block within the current picture and including at least one of a left block, an upper block, an upper right block, or an upper left block; and reconstructing the current sample of the current block using the intra prediction reference sample and the residual information of the current block, wherein the intra prediction reference sample is located in a sub-pixel position between the at least one boundary sample of the current block and the at least one boundary sample of the neighbor block within the current picture, wherein based on a relative position of an upper left corner sample of the current block being (0, 0), a relative position of the intra prediction reference sample is (m/c, n/c), and wherein at least one of the m or the n is −1 and the c is a constant.

2. The method of claim 1, wherein the intra prediction mode corresponds to at least one of a vertical direction mode, a horizontal direction mode, a DC direction mode, a diagonal down right mode, and a diagonal down left mode.

3. The method of claim 1, wherein the intra prediction mode indicates direction information for predicting the current sample of the current block within the current picture.

4. The method of claim 2, wherein based on the intra prediction mode corresponding to the vertical direction mode, the intra prediction reference sample is obtained only by a vertical filtering of a boundary sample of the neighboring block and a boundary sample of the current block, based on the intra prediction mode corresponding to the horizontal direction mode, the intra prediction reference sample is obtained only by a horizontal filtering of a boundary sample of the neighboring block and a boundary sample of the current block, or based on the intra prediction mode corresponding to a prediction mode other than the vertical direction mode and the horizontal direction mode, the intra prediction reference sample is obtained by vertical and horizontal filtering of two boundary samples of the neighboring block and two boundary samples of the current block.

5. The method of claim 2, wherein based on a relative position of the current sample being (x, y) and the intra prediction mode corresponding to the vertical direction mode, the relative position of the intra prediction reference sample is (x, −½), or based on the relative position of the current sample being (x, y) and the intra prediction mode corresponding to the horizontal direction mode, the relative position of the intra prediction reference sample is (−½, y).

6. The method of claim 2, wherein based on a relative position of the current sample being (x, y) and the intra prediction mode corresponding to the diagonal down right mode, the relative position of the intra prediction reference sample is (x−m/2, −½) or (−½, y−m/2), or based on a relative position of the current sample being (x, y) and the intra prediction mode corresponding to the diagonal down left mode, the relative position of the intra prediction reference sample is (x+m/2, −½), wherein m is an odd integer.

7. The method of claim 4, wherein based on the intra prediction mode corresponding to the vertical direction mode, the intra prediction reference sample is obtained only by a vertical filtering of a boundary sample of the neighboring block and a boundary sample of the current block.

8. The method of claim 4, wherein based on the intra prediction mode corresponding to the horizontal direction mode, the intra prediction reference sample is obtained only by a horizontal filtering of a boundary sample of the neighboring block and a boundary sample of the current block.

9. The method of claim 4, wherein based on the intra prediction mode corresponding to a prediction mode other than the vertical direction mode and the horizontal direction mode, the intra prediction reference sample is obtained by vertical and horizontal filtering of two boundary samples of the neighboring block and two boundary samples of the current block.

10. The method of claim 5, wherein based on a relative position of the current sample being (x, y) and the intra prediction mode corresponding to the vertical direction mode, the relative position of the intra prediction reference sample is (x, −½).

11. The method of claim 5, wherein based on the relative position of the current sample is (x, y) and the intra prediction mode corresponds to the horizontal direction mode, the relative position of the intra prediction reference sample is (−½, y).

12. The method of claim 6, wherein based on a relative position of the current sample being (x, y) and the intra prediction mode corresponding to the diagonal down right mode, the relative position of the intra prediction reference sample is (x−m/2, −½) or (−½, y−m/2), wherein m is an odd integer.

13. The method of claim 6, wherein based on a relative position of the current sample being (x, y) and the intra prediction mode corresponding to the diagonal down left mode, the relative position of the intra prediction reference sample is (x+m/2, −½), wherein m is an odd integer.

14. An apparatus for processing a video signal, comprising:

an entropy decoding unit configured to obtain residual information of a current block from the video signal, the current block being coded in an intra prediction mode, the intra prediction mode corresponding to predicting a current sample of the current block within a current picture comprising the current block;

an intra prediction unit configured to obtain an intra prediction reference sample from interpolation of at least one boundary sample of a neighbor block and at least one boundary sample of the current block, the neighbor block being adjacent to the at least one boundary sample of the current block within the current picture and including at least one of a left block, an upper block, an upper right block, or an upper left block; and a current block reconstructing unit configured to reconstruct the current sample of the current block using the intra prediction reference sample and the residual information of the current block, wherein the intra prediction reference sample is located in a sub-pixel position between the at least one boundary sample of the current block and the at least one boundary sample of the neighbor block within the current picture, wherein based on a relative position of an upper left corner sample of the current block being (0, 0), a relative position of the intra prediction reference sample is (m/c, n/c), and wherein at least one of the m or the n is −1 and the c is a constant.

15. The apparatus of claim 14, wherein the intra prediction mode corresponds to at least one of a vertical direction mode, a horizontal direction mode, a DC direction mode, a diagonal down right mode, and a diagonal down left mode.

16. The apparatus of claim 14, wherein the intra prediction mode indicates direction information for predicting the current sample of the current block within the current picture.

17. The apparatus of claim 15, wherein based on the intra prediction mode corresponding to the vertical direction mode, the intra prediction reference sample is obtained only by a vertical filtering of a boundary sample of the neighboring block and a boundary sample of the current block, based on the intra prediction mode corresponding to the horizontal direction mode, the intra prediction reference sample is obtained only by a horizontal filtering of a boundary sample of the neighboring block and a boundary sample of the current block, or based on the intra prediction mode corresponding to a prediction mode other than the vertical direction mode and the horizontal direction mode, the intra prediction reference sample is obtained by vertical and horizontal filtering of two boundary samples of the neighboring block and two boundary samples of the current block.

18. The apparatus of claim 15, wherein based on a relative position of the current sample being (x, y) and the intra prediction mode corresponding to the vertical direction mode, the relative position of the intra prediction reference sample is (x, −½), or based on the relative position of the current sample being (x, y) and the intra prediction mode corresponding to the horizontal direction mode, the relative position of the intra prediction reference sample is (−½, y).

19. The apparatus of claim 15, wherein based on a relative position of the current sample being (x, y) and the intra prediction mode corresponding to the diagonal down right mode, the relative position of the intra prediction reference sample is (x−m/2, −½) or (−½, y−m/2), or based on a relative position of the current sample being (x, y) and the intra prediction mode corresponding to the diagonal down left mode, the relative position of the intra prediction reference sample is (x+m/2, −½), wherein m is an odd integer.

* * * * *